United States Patent
Ichimura et al.

(10) Patent No.: US 10,284,692 B2
(45) Date of Patent: May 7, 2019

(54) CONTROL DEVICE AND COMMUNICATION DEVICE

(71) Applicant: OMRON Corporation, Kyoto (JP)

(72) Inventors: Katsuhiko Ichimura, Yokohama (JP); Masaichi Takai, Ritto (JP); Yasuhiro Nishimura, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 15/708,146

(22) Filed: Sep. 19, 2017

(65) Prior Publication Data
US 2018/0109655 A1 Apr. 19, 2018

(30) Foreign Application Priority Data

Oct. 14, 2016 (JP) ................................. 2016-202215

(51) Int. Cl.
| | |
|---|---|
| H04L 29/06 | (2006.01) |
| G05B 19/418 | (2006.01) |
| H04L 7/00 | (2006.01) |
| G06F 1/12 | (2006.01) |
| G06F 1/14 | (2006.01) |

(52) U.S. Cl.
CPC .......... *H04L 69/28* (2013.01); *G05B 19/4185* (2013.01); *G06F 1/12* (2013.01); *G06F 1/14* (2013.01); *H04L 7/0008* (2013.01); *G05B 2219/31213* (2013.01)

(58) Field of Classification Search
CPC ......... H04L 69/28; H04L 7/0008; G06F 1/14; G06F 1/12; G05B 19/4185; G05B 2219/31213
See application file for complete search history.

(56) References Cited

U.S. PATENT DOCUMENTS

| 2013/0173950 A1* | 7/2013 | Banerjea ............... H04J 3/0664 713/503 |
| 2016/0080533 A1* | 3/2016 | Jeon .................... H04L 12/6418 370/402 |
| 2016/0292110 A1 | 10/2016 | Niwa et al. |

FOREIGN PATENT DOCUMENTS

JP 2014120884 6/2014

OTHER PUBLICATIONS

"Search Report of Europe Counterpart Application", dated Feb. 15, 2018, p. 1-p. 8.

* cited by examiner

*Primary Examiner* — Afshawn M Towfighi
(74) *Attorney, Agent, or Firm* — JCIPRNET

(57) ABSTRACT

A configuration for realizing time synchronization between different protocols is provided. There is provided a control device that constitutes a control system for controlling machines or facilities. The control device includes first communication means configured to transmit and receive data in accordance with a first protocol. The first communication means includes a first timer that defines a time of data transmission and is time-synchronized with an entity to and from which data is transmitted and received. The control device includes second communication means configured to transmit and receive data in accordance with a second protocol different from the first protocol. The second communication means includes a second timer that defines a time of data transmission and is time-synchronized with an entity to and from which data is transmitted and received. The control device includes synchronization means configured to time-synchronize the first timer and the second timer.

8 Claims, 15 Drawing Sheets

CONTROL DEVICE AND COMMUNICATION DEVICE

CROSS-REFERENCE TO RELATED APPLICATION

This application claims the priority benefit of Japan application serial no. 2016-202215, filed on Oct. 14, 2016. The entirety of the above-mentioned patent application is hereby incorporated by reference herein and made a part of this specification.

BACKGROUND OF THE INVENTION

Field of the Invention

The present invention relates to a control device and a communication device that constitute a control system for controlling machines or facilities.

Description of Related Art

A control device such as a programmable logic controller (PLC) has spread as a main component for realizing various types of factory automation (FA). Such a control device transmits and receives data to and from one or more functional units via a bus or a network.

When a plurality of functional units are connected via a bus or a network, a delay based on transmission of data occurs. The magnitude of such a transmission delay varies depending on positions to which the functional units are connected. There is a likelihood that times at which the functional units acquire input data and output data will vary depending on the variation of the delay time.

Regarding this problem, Japanese Unexamined Patent Application Publication No. 2014-120884 (Patent Document 1) discloses an environment in which a synchronization time in a control system including a master device and one or more slave devices connected thereto via a network can be easily determined. The control system disclosed in Patent Document 1 performs time synchronization between associated devices or units and performs necessary processes at designated times.

PRIOR ART DOCUMENT

Patent Documents

[Patent Document 1] Japanese Unexamined Patent Application Publication No. 2014-120884

SUMMARY OF THE INVENTION

With enhancement in functionality of a control system, a configuration in which data is transmitted and received via different buses or networks is also realized. In such a configuration, data is transmitted and received by communication based on different protocols.

It is preferable that input or output times be synchronized between functional units included in a control system. In order to realize such synchronization, a technique of time synchronization between different protocols is necessary. Patent Document 1 does not disclose time synchronization between different protocols.

An object of the present invention is to provide a new configuration for realizing time synchronization between different protocols.

According to an aspect of the present invention, there is provided a control device constituting a control system for controlling machines or facilities. The control device includes first communication means configured to transmit and receive data in accordance with a first protocol. The first communication means includes a first timer that defines a time of data transmission and is time-synchronized with an entity to and from which data is transmitted and received. The control device includes second communication means configured to transmit and receive data in accordance with a second protocol different from the first protocol. The second communication means includes a second timer that defines a time of data transmission and is time-synchronized with an entity to and from which data is transmitted and received. The control device includes synchronization means configured to time-synchronize the first timer and the second timer.

Preferably, the synchronization means time-corrects the second timer with respect to the first timer. Preferably, the synchronization means time-synchronizes each entity time-synchronized with the second communication means with the second timer which has been time-corrected.

Preferably, the synchronization means includes: means configured to set the first timer to output a synchronization signal to the second timer every predetermined cycle; means configured to notify the second timer of a first time in the first timer indicating a time at which the synchronization signal is output and which is set in the first timer; and means configured to time-correct the second timer on the basis of a difference between the first time and a second time in the second timer at which the synchronization signal output from the first timer is detected by the second timer.

Preferably, the control device further includes an interface for connection to an external device including a third timer. The synchronization means time-corrects the first timer and the second timer with respect to the third timer of the external device.

Preferably, the external device is connected to the control device via communication means which is independent from the first communication means and the second communication means.

Preferably, the external device is connected to the control device via an entity that transmits and receives data to and from any one of the first communication means and the second communication means.

Preferably, the synchronization means includes: means configured to set the third timer to output a synchronization signal to the first timer at a designated third time; means configured to read a fourth time in the first timer which is stored when the synchronization signal output from the third timer is detected by the first timer from the first timer; and means configured to instruct the first timer to correct time on the basis of a difference between the third time and the fourth time.

Preferably, the synchronization means includes means configured to provide setting for a noise filter included in the first timer. The first timer compensates for a time delay generated due to the noise filter on the basis of the setting for the noise filter and then stores the fourth time.

A communication device according to another aspect of the present invention includes first communication means configured to transmit and receive data in accordance with a first protocol. The first communication means includes a first timer that defines a time of data transmission and is time-synchronized with an entity to and from which data is transmitted and received. The communication device includes second communication means configured to transmit and receive data in accordance with a second protocol different from the first protocol. The second communication means includes a second timer that defines a time of data transmission and is time-synchronized with an entity to and from which data is transmitted and received. The communication device includes synchronization means configured to time-synchronize the first timer and the second timer.

According to the present invention, it is possible to realize time synchronization between different protocols.

DESCRIPTION OF THE EMBODIMENTS

Figure 1:
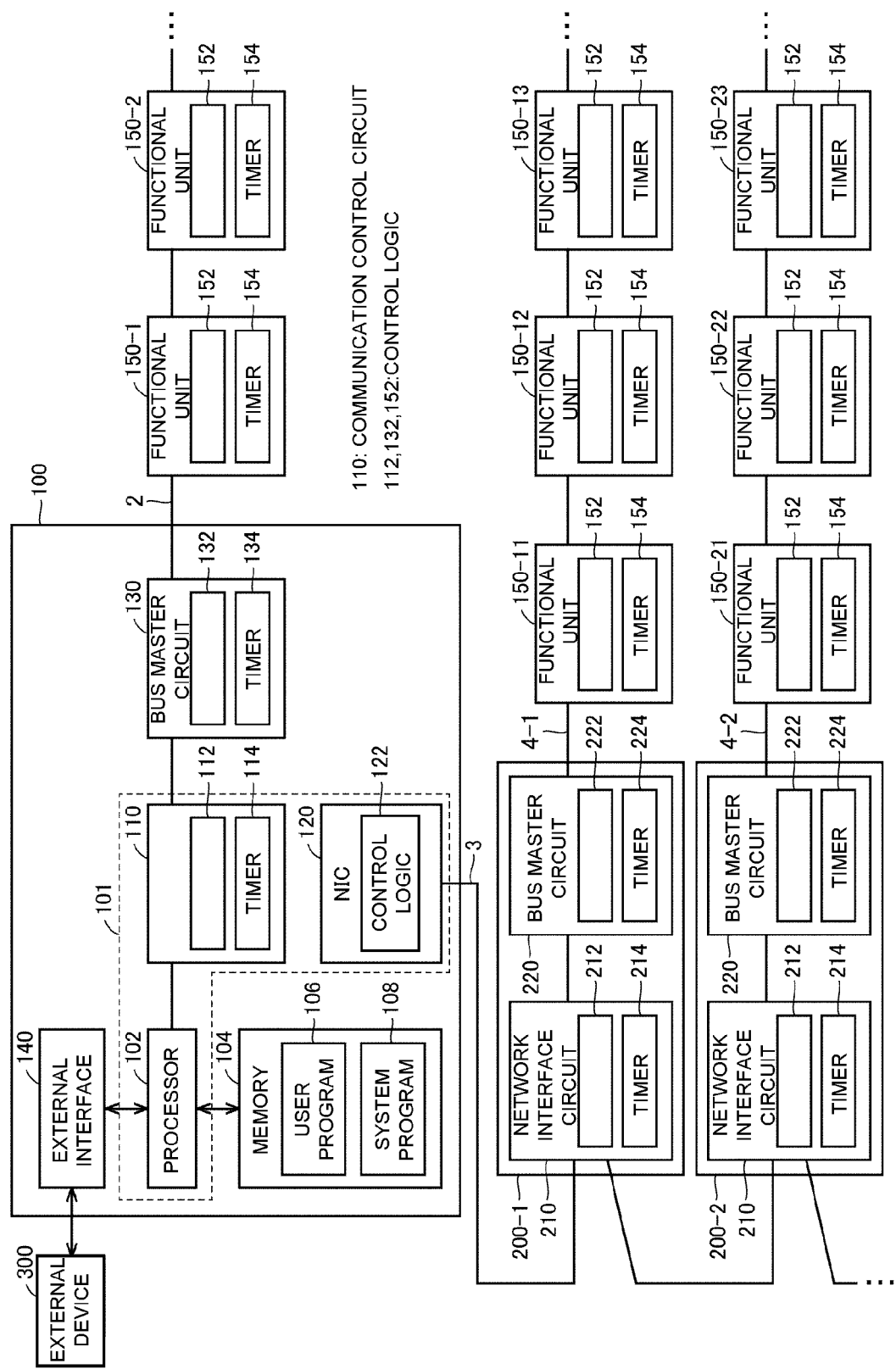
FIG. 1 is a schematic diagram illustrating a configuration of principal parts of a control system according to an embodiment.

An embodiment of present invention will be described below in detail with reference to the accompanying drawings. The same or corresponding elements in the drawings will be referenced by the same reference signs and description thereof will not be repeated.

In the following description, a system (hereinafter also referred to as a "control system") based on a programmable logic controller (PLC) will be described as a specific example, but the technical spirit disclosed in this specification can be applied to an arbitrary control device without being limited to the name PLC.

A. System Configuration

A system configuration of a control system 1 according to an embodiment of the present invention will be described below. FIG. 1 is a schematic diagram illustrating a configuration of principal parts of the control system 1 according to this embodiment.

Referring to FIG. 1, the control system 1 according to this embodiment mainly controls machines or facilities. The control system 1 includes one or more communication means and data is transmitted and received via the communication means. In this specification, "communication means" includes an entire framework for transmitting and receiving data between a plurality of entities (for example, devices or units) in accordance with a certain protocol. For example, "communication means" may be one of a parallel communication mode and a serial communication mode or may be one of a bus and a network.

For example, the control system 1 includes a CPU unit 100 that constitutes the PLC and one or more communication coupler units 200-1, 200-2, . . . (hereinafter generically referred to as "communication coupler units 200") that are connected thereto via a field network 3. The CPU unit 100 or each communication coupler unit 200 may be equipped with one or more functional units. A set of a communication coupler unit 200 and one or more functional units may be referred to as a remote I/O device.

In the control system 1 illustrated in FIG. 1, functional units 150-1, 150-2, . . . are connected to the CPU unit 100 via a local bus 2. Functional units 150-11, 150-12, 150-13, . . . are connected to the communication coupler unit 200-1 via a local bus 4-1, and functional units 150-21, 150-22, 150-23, . . . are connected to the communication coupler unit 200-2 via a local bus 4-2. These functional units are generically referred to as "functional units 150", and the local buses 4-1, 4-2, . . . are generically referred to as "local buses 4."

In the control system 1 according to this embodiment, the local bus 2, the field network 3, the local bus 4-1, and the local bus 4-2 employ communication modes which are suitable for transmitting and receiving field data. Typically, it is preferable to employ communication modes in which a communication cycle, a data transmission time, or the like can be predicted. A communication mode in which a transmission time of data is guaranteed may be employed as an example of such communication modes. A type of fixed-cycle bus or a type of fixed-cycle network is employed by such communication modes.

An arbitrary bus communication mode can be employed as the fixed-cycle bus. A network associated with known protocols such as EtherCAT (registered trademark), EtherNet/IP (registered trademark), DeviceNet (registered trademark), and CompoNet (registered trademark) may be employed as the fixed-cycle network.

When a communication mode in which a transmission time of data is not guaranteed is employed, the same function as the fixed-cycle bus or the fixed-cycle network can be realized by scheduling a data transmission time in consideration of a margin corresponding to fluctuation of a transmission time.

In realizing such transmission of field data, a configuration in which units associated with data transmission include timers which are time-synchronized with each other is supposed. That is, in each bus or each network, the units transmit or receive data at a time which is designated using timers time-synchronized with each other.

In the control system 1 according to this embodiment, the local bus 2, the field network 3, and the local buses 4 may employ the same protocol or may employ protocols independent from each other. Regardless of what protocol is employed, it is assumed that a timer serving as a reference for data transmission is provided.

A real-time clock may be employed as a timer, but a free-run counter (hereinafter also referred to as "FRC") that counts up (increments) at a predetermined cycle is used in this embodiment. A current time can be calculated using a counter value output from the free-run counter as an elapsed time from a certain time point, and thus the free-run counter can function as a timer.

The local bus 2, the field network 3, and the local buses 4 are named for the purpose of convenience of explanation, and the technical scope of the present invention is not limited by the names.

Configurations of units constituting the control system 1 will be described below.

(a1: CPU Unit 100)

The CPU unit 100 is an element constituting the control system 1 including the PLC and corresponds to a control device that controls processing in the control system 1. The CPU unit 100 and one or more functional units 150 are connected to each other via the local bus 2 which is an example of communication means. Accordingly, the CPU unit 100 also functions as a type of communication device.

The CPU unit 100 includes a processor 102, a memory 104, a communication control circuit 110, a network interface card (hereinafter also abbreviated to "NIC") 120, a bus master circuit 130, and an external interface 140.

The processor 102 executes a program stored in the memory 104 or the like. For the purpose of convenience of explanation, only one processor 102 is illustrated in FIG. 1, but a plurality of processors may be mounted. Each processor may include a plurality of cores.

The memory 104 includes a portion (typically, a volatile memory) that provides a work area required for execution of a program in the processor 102 and a portion (typically, a nonvolatile memory) that stores the program which is executed by the processor 102. A dynamic random access memory (DRAM), a static random access memory (SRAM), or the like can be used as the volatile memory and a flash memory, a hard disk, or the like can be used as the nonvolatile memory.

The memory 104 stores a user program 106, a system program 108, and the like. The system program 108 includes an operating system (OS) for allowing the processor 102 to execute the user program 106 and a library. The user program 106 typically includes commands for performing a process of acquiring data (input data) collected by one or more functional units or a process of generating data (output data) to be transmitted to one or more functional units, and is arbitrarily prepared depending on machines or facilities that are control targets.

The communication control circuit 110 has a function of relaying a request between the processor 102, the NIC 120, and the bus master circuit 130 and, for example, requests the NIC 120 and/or the bus master circuit 130 to transmit output data in response to a communication request from the processor 102. The communication control circuit 110 includes a control logic 112 and a timer 114. The control logic 112 is a portion that accomplishes a duty imposed on the communication control circuit 110 and is embodied by software and/or by hardware. The timer 114 includes a free-run counter that generates a pulse (a clock) serving as a reference for a control time in the control logic 112.

It is preferable that at least principal parts of the communication control circuit 110 have a hard-wired configuration and realize faster processing than the processor 102. That is, the communication control circuit 110 is embodied using a hardware logic. For example, the communication control circuit 110 may be embodied using a field-programmable gate array (FPGA) which is an example of a programmable logic device (PLD), an application specific integrated circuit (ASIC) which is an example of an integrated circuit (IC), or the like.

In the configuration illustrated in FIG. 1, for example, a system-on-chip (SOC) 101 in which the processor 102, the communication control circuit 110, and the NIC 120 are mounted on the same chip is configured. The present invention is not limited to such a configuration, and the units may be mounted on different chips or the entire units may be mounted together on the same chip. Such mounting types can be appropriately selected in consideration of required performance, costs, or the like.

The NIC 120 functions as a communication master that manages data transmission over the field network 3. That is, the NIC 120 transmits and receives data to and from a remote I/O device (the communication coupler units 200 and the functional units mounted in the communication coupler units 200) via the field network 3 which is an example of communication means.

The NIC 120 includes a control logic 122 that manages data transmission over the field network 3. More specifically, the control logic 122 performs time management and transmission/reception time management for guaranteeing a transmission time of data which is transmitted over the field network 3. As will be described later, the control logic 122 of the NIC 120 determines a control time on the basis of a time which is managed by the timer 114 of the communication control circuit 110.

The bus master circuit 130 functions as a communication master that manages data transmission over the local bus 2. That is, the bus master circuit 130 transmits and receives data to and from the functional units 150 which are mounted in the CPU unit 100 via the local bus 2 which is an example of communication means.

The bus master circuit 130 includes a control logic 132 that manages data transmission over the local bus 2 and a timer 134 that determines a control time in the control logic 132. The control logic 132 performs time management and transmission/reception time management for guaranteeing a transmission time of data which is transmitted over the local bus 2.

The external interface 140 relays transmission and reception of data to and from an arbitrary external device 300. An interface using a versatile interface standard such as PC Express or Universal Serial Bus (USB) can be employed as the external interface 140. That is, the external device 300 may be connected to the CPU unit 100 via communication means independent from the local bus 2 or the field network 3. As will be described later, an external device including a timer serving as a reference for time synchronization can be employed as the external device 300. A configuration using the timer included in the external device 300 will be described later.

(a2: Functional Unit 150)

The functional units 150 provide various functions required for the control system 1 to realize control of various machines or facilities. Typically, each functional unit 150 performs collection of field information in machines or facilities that are control targets, output of a command signal to the machines or facilities that are control targets, and the like.

Each functional unit 150 functions as a bus slave that performs data transmission under the control of the bus master circuit 130 of the CPU unit 100. More specifically, regarding data transmission over the local bus 2, each functional unit 150 includes a control logic 152 that manages data transmission over the local bus 2 and a timer 154 that determines a control time in the control logic 152. The control logic 152 manages a time at which data transmitted over the local bus 2 is transmitted or received in accordance with a command from the bus master circuit 130. The control logic 152 monitors and adjusts a time at which the timer 154 generates a pulse in time-synchronization with the timer 134 of the bus master circuit 130.

As will be described later, the same is true of a case in which the functional units are attached to the communication coupler units 200 via the local buses 4.

(a3: Communication Coupler Unit 200)

The communication coupler unit 200 functions as a relay device that relays transmission and reception of data between one or more functional units 150 attached to the communication coupler units 200 via the local buses 4 and the CPU unit 100. More specifically, the communication coupler unit 200 includes a network interface circuit 210 and a bus master circuit 220.

The network interface circuit 210 functions as a network slave that performs data transmission over the field network 3 under the control of the NIC 120 of the CPU unit 100. More specifically, the network interface circuit 210 includes a control logic 212 that manages data transmission over the field network 3 and a timer 214 that determines a control time in the control logic 212. The control logic 212 manages a time at which data transmitted over the field network 3 is transmitted or received in accordance with a command from the NIC 120. The control logic 212 monitors and adjusts a time at which the timer 214 generates a pulse in time-synchronization with the timer of the NIC 120.

The bus master circuit 220 has the same function as the bus master circuit 130 of the CPU unit 100 and functions as a communication master that manages data transmission over the local buses 4. That is, the bus master circuit 220 transmits and receives data to and from the functional units 150 attached to the communication coupler units 200 via the local buses 4 which are an example of communication means.

The bus master circuit 220 includes a control logic 222 that manages data transmission over the local buses 4 and a timer 224 that determines a control time in the control logic 222. The control logic 222 performs time management and transmission/reception time management for guaranteeing a transmission time of data which is transmitted over the local buses 4.

B. Outline

A time synchronization function which is provided by the control system 1 according to this embodiment will be described below. FIGS. 2A, 2B, 3A and 3B are schematic diagrams illustrating a time synchronization function which is provided by the control system 1 according to this embodiment.

Figure 2A:
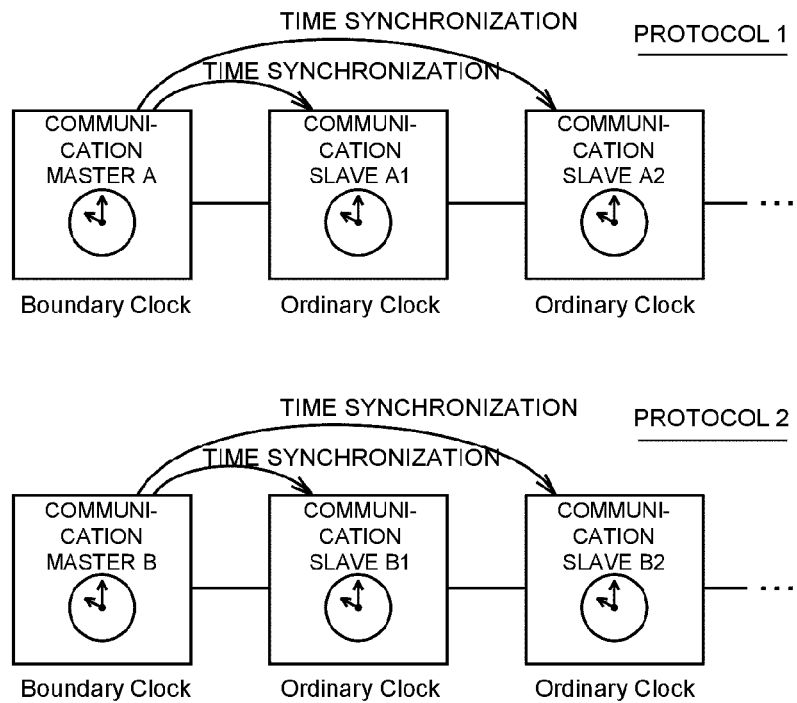
FIGS. 2A and 2B are schematic diagrams illustrating a time synchronization function which is provided by the control system according to the embodiment.

FIG. 2A illustrates a configuration in which data communication is performed in accordance with two different protocols (protocol 1 and protocol 2). Specifically, communication master A and a plurality of communication slaves A1, A2, . . . are connected to each other in a configuration example according to protocol 1, and communication master B and a plurality of communication slaves B1, B2, . . . are connected to each other in a configuration example according to protocol 2.

Each of communication master A and communication master B includes a timer functioning as a boundary clock and time-synchronizes timers of the communication slaves connected thereto via a bus/network in accordance with a synchronization procedure of each protocol. Each of the plurality of communication slaves A1, A2, . . . and each of the plurality of communication slaves B1, B2, . . . include a timer functioning as an ordinary clock.

That is, communication master A corresponds to communication means that transmits and receives data to and from the plurality of communication slaves A1, A2, . . . in accordance with protocol 1. Communication master A which is the communication means includes a timer that defines a time of data transmission and that is time-synchronized with entities (that is, communication slaves A1, A2, . . . ) to and from which data is transmitted and received. Similarly, communication master B corresponds to communication means that transmits and receives data to and from the plurality of communication slaves B1, B2, . . . in accordance with protocol 2 which is different from protocol 1. Communication master B which is the communication means includes a timer that defines a time of data transmission and that is time-synchronized with entities (that is, communication slaves B1, B2, . . . ) to and from which data is transmitted and received.

In the configuration illustrated in FIG. 2A, means that time-synchronizes a configuration according to protocol 1 and a configuration according to protocol 2 is not provided. Accordingly, even when communication master A and communication master B are mounted on the same CPU unit 100, communication slaves A1, A2, . . . and communication slaves B1, B2, . . . cannot be time-synchronized. As a result, since protocols of connecting destinations are different from each other, a time at which input data is acquired and a time at which output data is output may be desynchronized with each other.

Figure 2B:
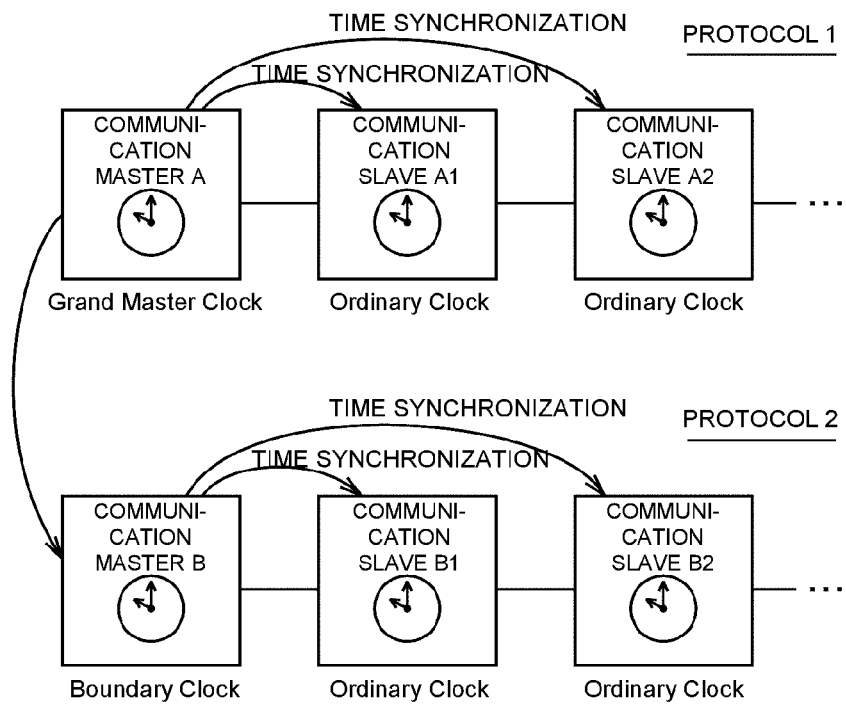

Therefore, in the control system 1 according to this embodiment, as illustrated in FIG. 2B, a timer of one of communication master A and communication master B functions as a master of the whole control system 1. Hereinafter, the master of the whole system is also referred to as a "grand master clock." In FIGS. 2A and 2B, only two communication masters are illustrated, but three or more communication masters may be present. In this case, a timer of any one communication master can be set as the grand master clock.

For example, in FIG. 2B, the timer of communication master A is set as the grand master clock, and communication master B is time-synchronized with the wand master clock. According to this configuration, the configuration according to protocol 1 and the configuration according to protocol 2 can be time-synchronized with each other. That is, the control system 1 according to this embodiment has a synchronization function of time-synchronizing the timer time-synchronized between communication master A and communication slaves A1, A2, . . . and the timer time-synchronized between communication master B and communication slaves B1, B2, . . . .

In this case, the timer of communication master A functions as the grand master clock, and also functions as a boundary clock in the configuration according to protocol 1. That is, the synchronization function of the control system 1 according to this embodiment time-corrects the timer in the configuration according to protocol 2 with respect to the timer in the configuration according to protocol 1. More specifically, communication slaves A1, A2, . . . are time-synchronized with the timer of communication master A, and communication slaves B1, B2, . . . are time-synchronized with the timer of communication master B. At this time, since communication master B is time-synchronized with the timer of communication master A, communication slaves B1, B2, . . . are time-synchronized with the timer of communication A. In this way, entities (communication slaves B1, B2, . . . ) time-synchronized with communication B are time-synchronized with the timer of communication master B of which the time has been corrected.

Figure 3A:
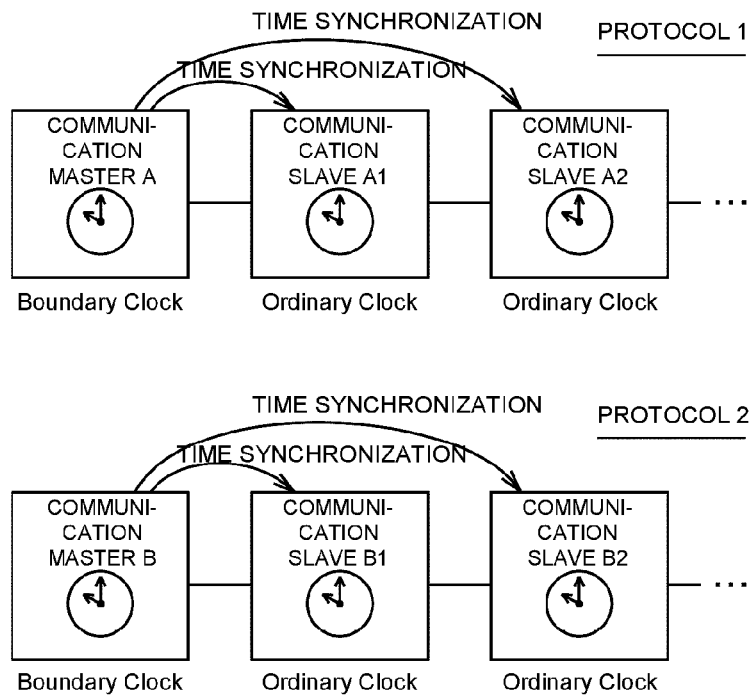
FIGS. 3A and 3B are schematic diagrams illustrating a time synchronization function which is provided by the control system according to the embodiment.

FIG. 2A and FIG. 2B illustrate a configuration example in which a timer of a certain communication master is set as a grand master clock, but a timer of an external device may be set as the grand master clock. Similarly to FIG. 2A, FIG. 3A illustrates a configuration in which data communication is performed in accordance with two protocols (protocol 1 and protocol 2).

Figure 3B:
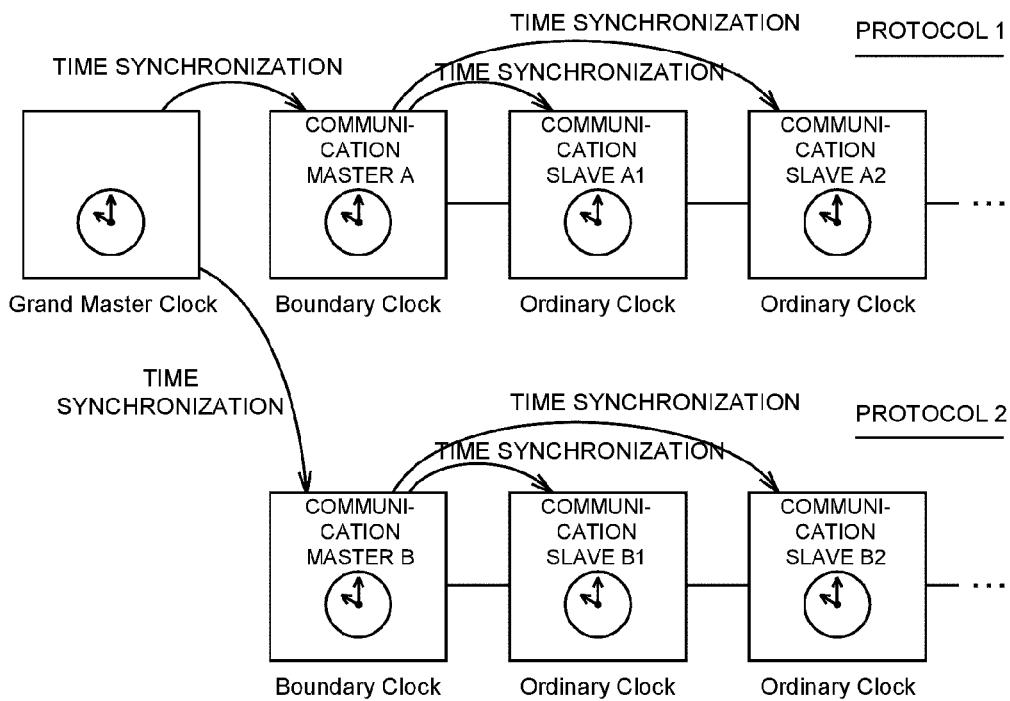

In the control system 1 according to this embodiment, as illustrated in FIG. 3B, a timer of an external device other than communication master A and communication master B functions as a master of the whole control system 1 (that is, a grand master clock). Communication master A and communication master B are time-synchronized with the grand master clock. That is, by connecting communication master A and communication master B to the external device including an independent timer, the timer of communication master A and the timer of communication master B are time-corrected with respect to the timer of the external device.

In this case, since the timer of communication timer A also functions as a boundary clock in the configuration according to protocol 1 and the timer of communication master B also functions as a boundary clock in the configuration according to protocol 2, communication slaves A1, A2, . . . are time-synchronized with the timer of communication master A, and communication slaves B1, B2, . . . are time-synchronized with the timer of communication master B. Since communication master A and communication master B are time-synchronized with the grand master clock, communication slaves A1, A2, . . . and communication slaves B1, B2, . . . are also time-synchronized with the grand master clock in the external device.

In FIG. 2B, communication master A has a function of adjusting the timer of communication master B with respect to its own timer (hereinafter also referred to as a "reference clock") in order to perform time synchronization with communication master B. The function of communication master A in FIG. 2B is referred to as a "synchronization function" in the following description. In FIG. 2B, communication master B has a function of adjusting its own timer with respect to the timer of communication master A (a reference clock). The function of communication master B in FIG. 2B is referred to as a "latch function" in the following description. That is, the "synchronization function" is mounted in an entity including a timer functioning as a grand master clock and the "latch function" is mounted in an entity which is time-synchronized with the grand master clock. By combination of the "synchronization function" and the "latch function," a mechanism illustrated in FIG. 2B is embodied.

In FIG. 3B, since the timer of the external device functions as the grand master clock, the "synchronization function" is mounted in the external device and the "latch function" is mounted in communication master A and communication master B which are time-synchronized with the grand master clock.

Examples of some system configurations having the "synchronization function" and the "latch function" will be described below.

Both functions illustrated in FIGS. 2A, 2B, 3A and 3B do not need to be mounted and only at least one function may be mounted.

Some mounting examples of a time synchronization function which is provided by the control system 1 according to this embodiment illustrated in FIG. 1 will be described below.

C. Configuration Example 1 of Control System

First, a configuration example in which the timer 114 of the communication control circuit 110 functions as a grand master clock in the control system 1 illustrated in FIG. 1 will be described below.

Figure 4:
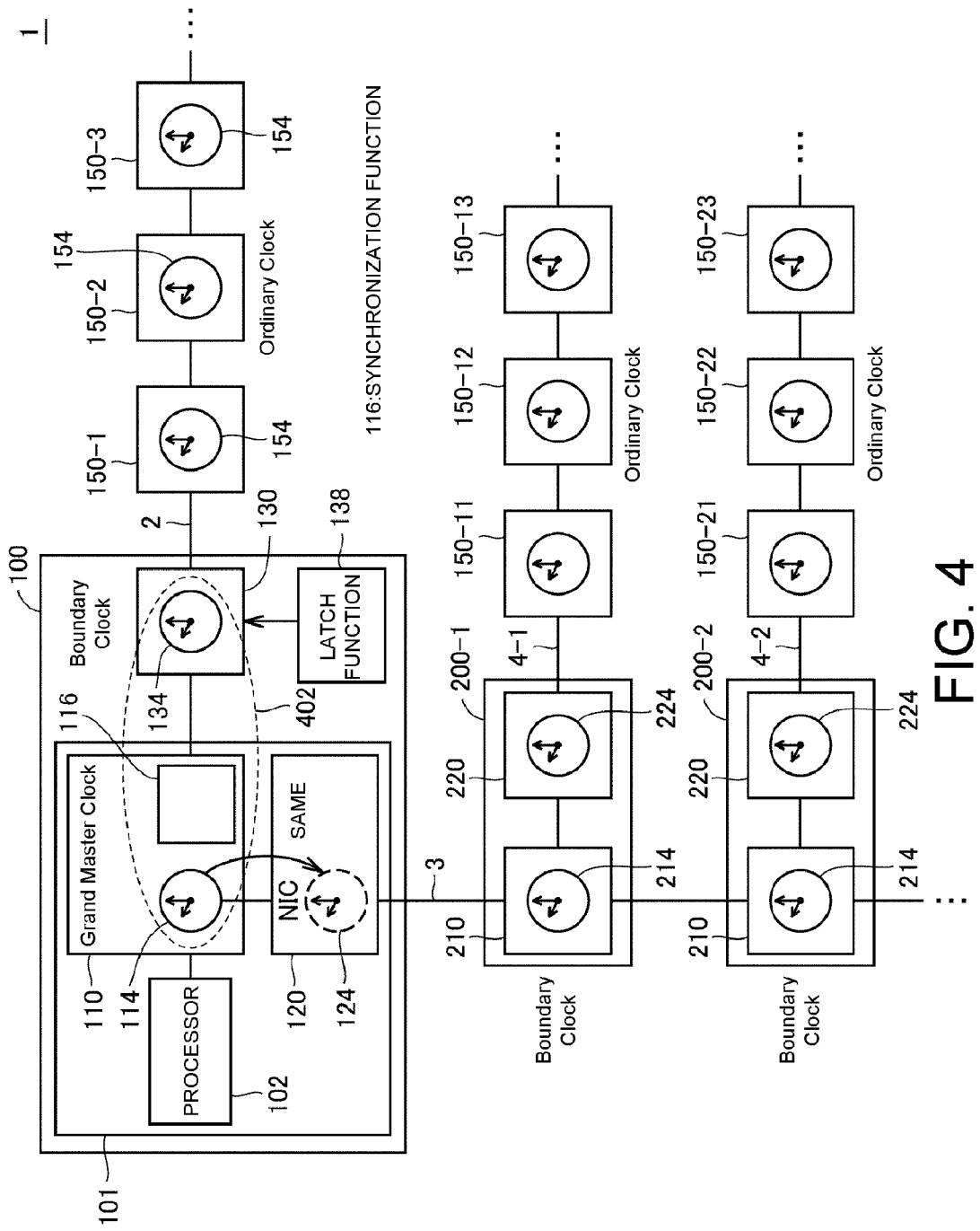
FIG. 4 is a schematic diagram illustrating functions of timers in configuration example 1 of the control system according to the embodiment.

FIG. 4 is a schematic diagram illustrating functions of the timers in configuration example 1 of the control system 1 according to this embodiment. Referring to FIG. 4, the communication control circuit 110 of the CPU unit 100 includes the timer 114 which functions as a grand master clock. In configuration example 1 illustrated in FIG. 4, since the communication control circuit 110 and the NIC 120 are mounted on the same SOC 101, the timer 114 also functions as a timer 124 of the NIC 120. That is, the timer 124 of the NIC 120 is virtual and an entity thereof is the same as the timer 114 of the communication control circuit 110. Accordingly, the timer 114 of the communication control circuit 110 functions as a boundary clock of the field network 3.

The timer 134 of the bus master circuit 130 functions as a boundary clock of the local bus 2 and is time-synchronized with the timer 114 of the communication control circuit 110 functioning as the grand master clock.

In order to realize time synchronization (reference numeral 402 in FIG. 4) between a plurality of timers in the CPU unit 100, a synchronization function 116 is mounted in the timer 114 of the communication control circuit 110 and a latch function 138 is mounted in the timer 134 of the bus master circuit 130. When the timer 114 asserts a synchronization signal at a designated time, the synchronization function 116 of the timer 114 notifies of the time at which the synchronization signal is asserted. When the bus master circuit 130 detects the synchronization signal from the timer 114, the latch function 138 sets a difference between the time (which is held by the bus master circuit 130) and the previously notified time as a time correction value in the timer 134.

Figure 5:
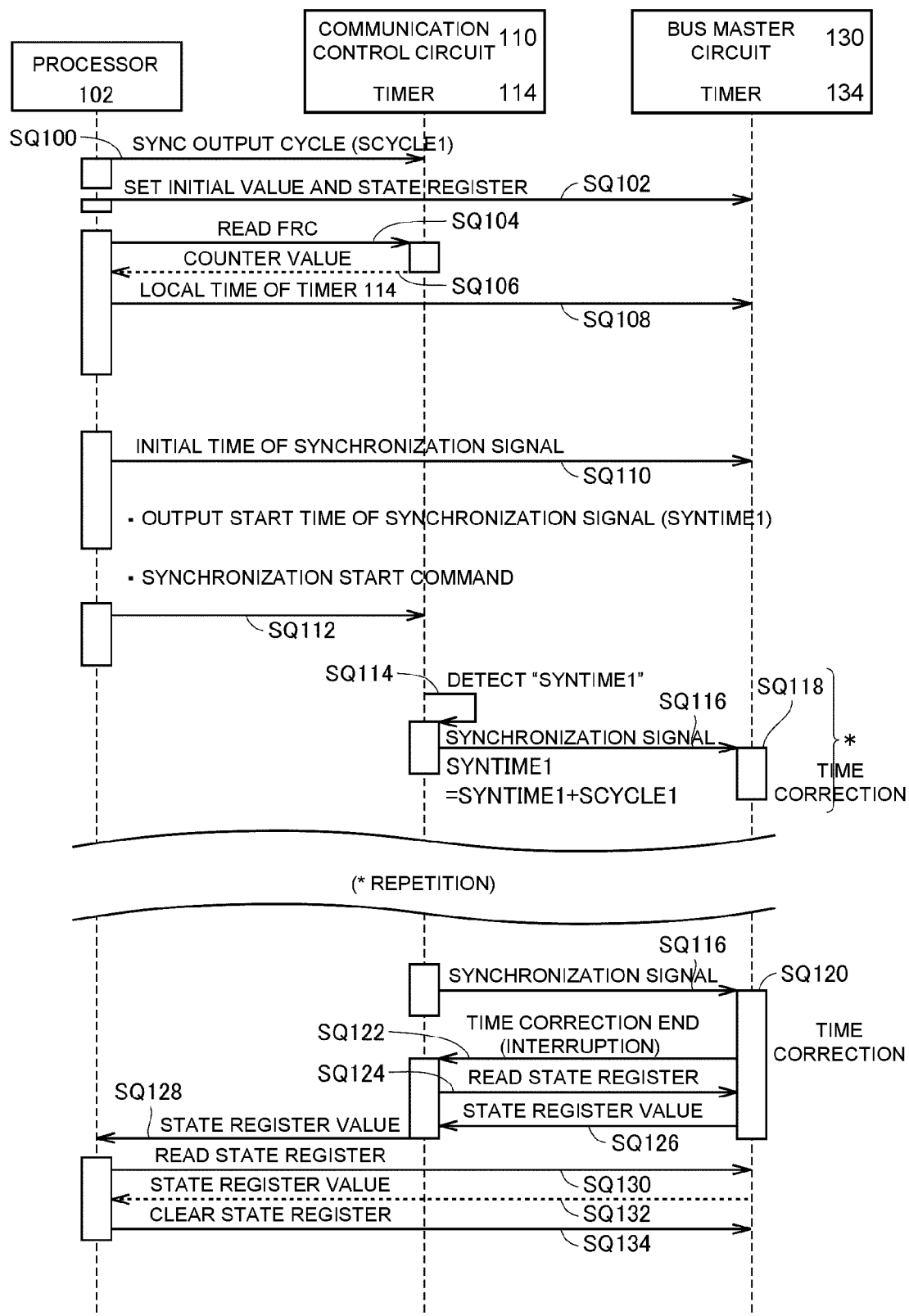
FIG. 5 is a sequence diagram illustrating an example of a time synchronization procedure between a timer of a communication control circuit and a timer of a bus master circuit in configuration example 1 of the control system according to the embodiment.

FIG. 5 is a sequence diagram illustrating an example of a time synchronization procedure between the timer 114 of the communication control circuit 110 and the timer 134 of the bus master circuit 130 in configuration example 1 of the control system 1 according to this embodiment. In the sequence diagram illustrated in FIG. 5, the processor 102, the timer 114 of the communication control circuit 110, and the timer 134 of the bus master circuit 130 cooperate with each other to realize time synchronization between the timer 114 of the communication control circuit 110 and the timer 134 of the bus master circuit 130. It is assumed that each of the timer 114 and the timer 134 includes a free-run counter and a logic that calculates a local time from a counter value output from the free-run counter.

In this embodiment, the timer 114 of the communication control circuit 110 asserts a synchronization signal (hereinafter also abbreviated to "SYNC") y predetermined cycle designated by the processor 102. The timer 134 of the bus master circuit 130 calculates a difference between the reference clock and the free-run counter of the timer 134 on the basis of the synchronization signal and sequentially corrects the free-run counter. An upper limit of a correction value per time for the free-run counter is determined. When it is detected that the correction value of the free-run counter is equal to or less than a predetermined value, the timer 134 of the bus master circuit 130 notifies the timer 114 of the communication control circuit 110 of time synchronization end. The notification of time synchronization end may be performed by interruption.

More specifically, as illustrated in FIG. 5, first, the processor 102 sets an output cycle of a synchronization signal for the timer 114 of the communication control circuit 110 (Sequence SQ100). The processor 102 sets a necessary initial value for the timer 134 of the bus master circuit 130 and sets a state register indicating an asynchronous state (Sequence SQ102). Sequence SQ102 may be realized by setting or changing a register value held by the bus master circuit 130. Here, as the time synchronization function, the processor 102 sets the timer 114 of the communication control circuit 110 such that a synchronization signal is output to the timer 134 of the bus master circuit 130 every predetermined cycle designated in advance.

Subsequently, the processor 102 reads the value of the free-run counter included in the timer 114 of the communication control circuit 110 (Sequence SQ104) and acquires a current counter value of the free-run counter (Sequence SQ106). Then, the processor 102 notifies the timer 134 of the bus master circuit 130 of the local time of the timer 114 (Sequence SQ108). This notification is a part of the time synchronization function and the processor 102 notifies the timer 134 of the bus master circuit 130 of the local time in the timer 114 of the communication control circuit 110 indicating a time at which the synchronization signal set is output and which is set in the timer 114 of the communication control circuit 110. The timer 114 sequentially corrects the free-run counter on the basis of a difference between a scheduled time at which the first synchronization signal is asserted and the local time at which the synchronization signal is actually detected.

More specifically, the processor 102 notifies the timer 134 of the bus master circuit 130 of the (scheduled) time at which the first synchronization signal is asserted (Sequence SQ110). That is, in Sequence SQ112 which will be described later, the timer 114 is instructed to start output of the synchronization signal, and the timer 134 is notified of the scheduled time at which the first synchronization signal will be output and which is counted from the time at which the output start is instructed.

Figure 13:
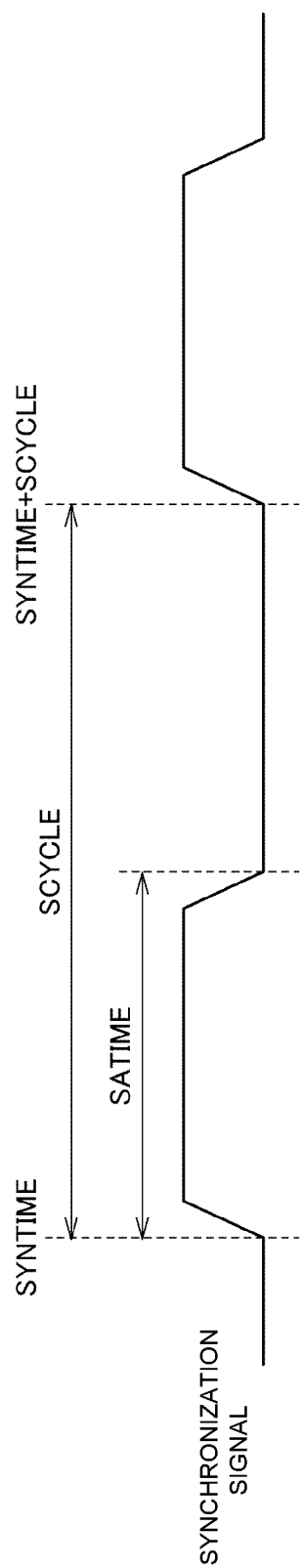
FIG. 13 is a timing chart illustrating a relationship between a parameter set in sequence SQ302 in FIG. 12 and an asserted synchronization signal.

Then, the processor 102 sets an output start time of the synchronization signal (SYNTIME1) and a synchronization start command for the timer 114 (Sequence SQ112). When the tinier 114 validates the output of the synchronization signal and counts up to designated SYNTIME1 in response to this setting, the timer asserts the synchronization signal to the timer 134 (Sequence SQ116). Since the timer 114 repeatedly asserts the synchronization signal at a designated output cycle (SCYCLE1) while the output of the synchronization signal is validated, SCYCLE1 is added to SYNTIME1 to calculate new SYNTIME1 (SYNTIME1←SYNTIME1+SCYCLE1). FIG. 13 and the like will be referred to for details of new SYNTIME1.

The timer 134 performs time correction by correcting the free-run counter on the basis of a difference from the output start time (SYNTIME1) of the synchronization signal and a difference from the local time at which the output cycle from the timer 114 is detected (Sequence SQ118). In this way, the timer 134 is subjected to time correction on the basis of the difference between the time (the local time) in the timer 134 at which the synchronization signal output from the timer 114 of the communication control circuit 110 is detected by the timer 134 of the bus master circuit 130 and the scheduled time at which the synchronization signal is asserted and which has been notified of in advance.

The processes of Sequences SQ114 to SQ118 are repeated until the correction value in Sequence SQ118 is equal to or less than a predetermined value. The upper limit of the correction value for the free-run counter may be set in advance.

When the correction value is equal to or less than the predetermined value and it is determined that synchronization of the timer 134 is completed, the timer 134 notifies the timer 114 of time synchronization end (Sequence SQ122). The notification of time synchronization end is performed by interruption from the timer 134 to the timer 114. When the notification of time synchronization end from the timer 134 is detected, the timer 114 reads the state register of the timer 134 (Sequence SQ124) and acquires the value of the state register of the timer 134 (Sequence SQ126). Then, the timer 114 notifies the processor 102 of the acquired value of the state register of the timer 134 (Sequence SQ128).

When the value of the state register of the timer 134 is detected from the timer 114, the processor 102 reads the state register of the timer 134 (Sequence SQ130) and acquires the value of the state register of the timer 134 (Sequence SQ132). Then, when the value of the state register notified of in Sequence SQ128 matches the value of the state register acquired in Sequence SQ132, the processor 102 clears the state register of the timer 134 (Sequence SQ134).

Through the above-mentioned procedure, time synchronization between the timer 114 of the communication control circuit 110 and the timer 134 of the bus master circuit 130 is realized. When the timer 114 of the communication control circuit 110 and the timer 134 of the bus master circuit 130 is time-desynchronized, time synchronization is realized again by repeatedly performing the processes of Sequences SQ114 to SQ118.

In configuration example 1 of the control system 1 according to this embodiment, times of various processes or control can be synchronized between the configurations according to a plurality of protocols which are provided in the same CPU unit 100.

D. Configuration Example 2 of Control System

Figure 6:
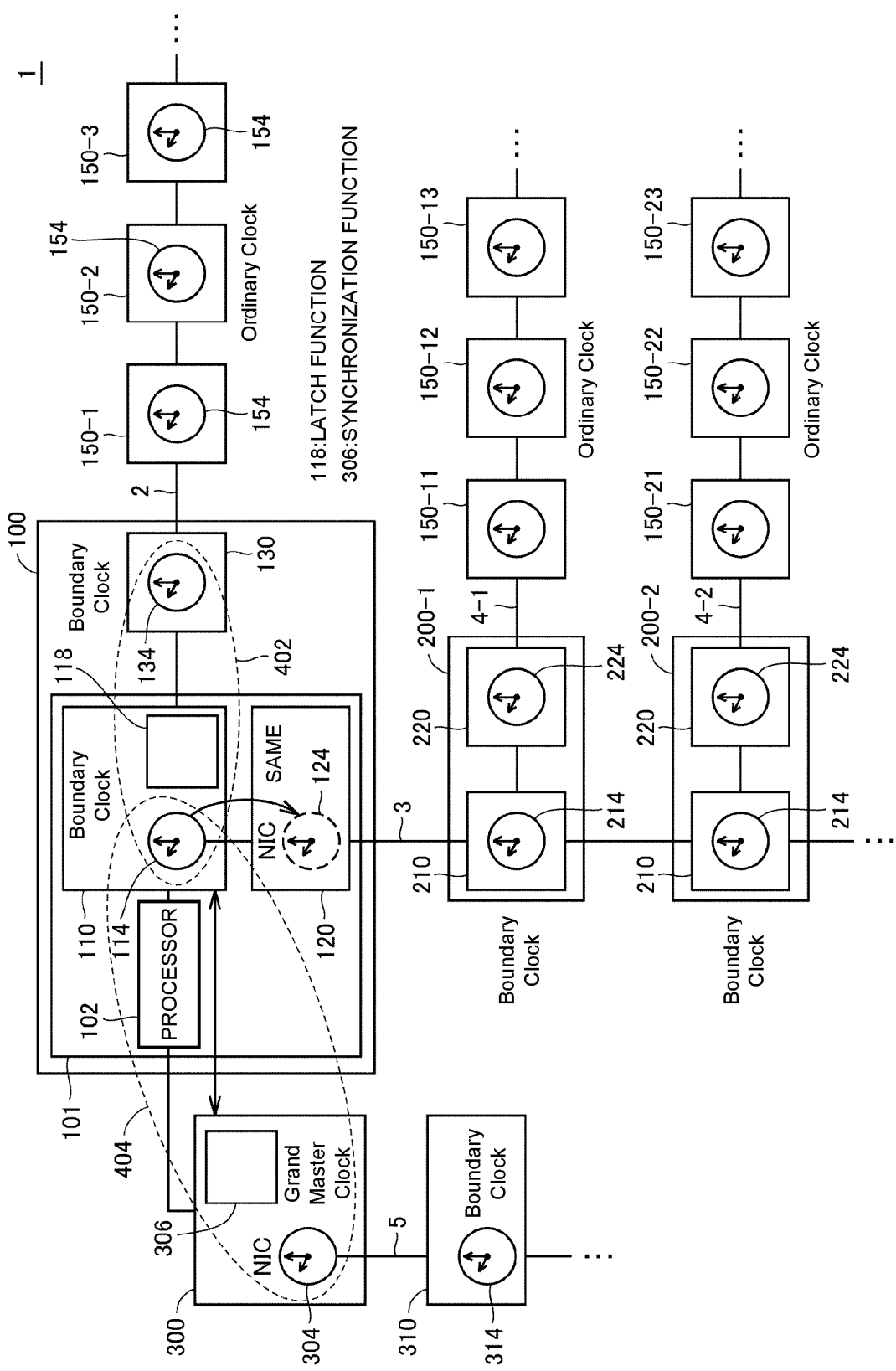
FIG. 6 is a schematic diagram illustrating functions of timers in configuration example 2 of the control system according to the embodiment.

In configuration example 1 of the control system, an example in which the timer 114 of the communication control circuit 110 functions as a grand master clock has been described above, but the timer 114 of the communication control circuit 110 may be time-synchronized with another clock. In this case, the other clock functions as a grand master clock. An example in which the timer 304 of the external device 300 connected to the CPU unit 100 in the control system 1 illustrated in FIG. 1 functions as a grand master clock will be described below FIG. 6 is a schematic diagram illustrating functions of the timers in configuration example 2 of the control system 1 according to this embodiment. Referring to FIG. 6, an external device 300 is connected to the CPU unit 100 and the external device 300 includes a timer 304 which functions as a grand master clock.

In configuration example 2 illustrated in FIG. 6, the timer 304 of the external device 300 is a reference clock of the timer 114 of the communication control circuit 110. That is, the timer 114 of the communication control circuit 110 functions as a boundary clock of the field network 3 and is synchronized with the timer 304 of the external device 300 functioning as a grand master clock. The timer 134 of the bus master circuit 130 functions as a boundary clock of the local bus 2 and is synchronized with the timer 114 of the communication control circuit 110 functioning as the boundary clock. The time synchronization procedure between the timer 134 of the bus master circuit 130 and the timer 114 of the communication control circuit 110 is the same as described in configuration example 1 of the control system and detailed description thereof will not be repeated.

In configuration example 2 illustrated in FIG. 6, the external device 300 has the same function as the NIC 120 of the CPU unit 100 and functions as a communication master of the field network 5. An arbitrary slave device 310 may be connected to the field network 5. In this case, the slave device 310 connected to the field network 5 time-synchronizes the timer 314 thereof with the timer 304 of the external device 300.

Figure 7:
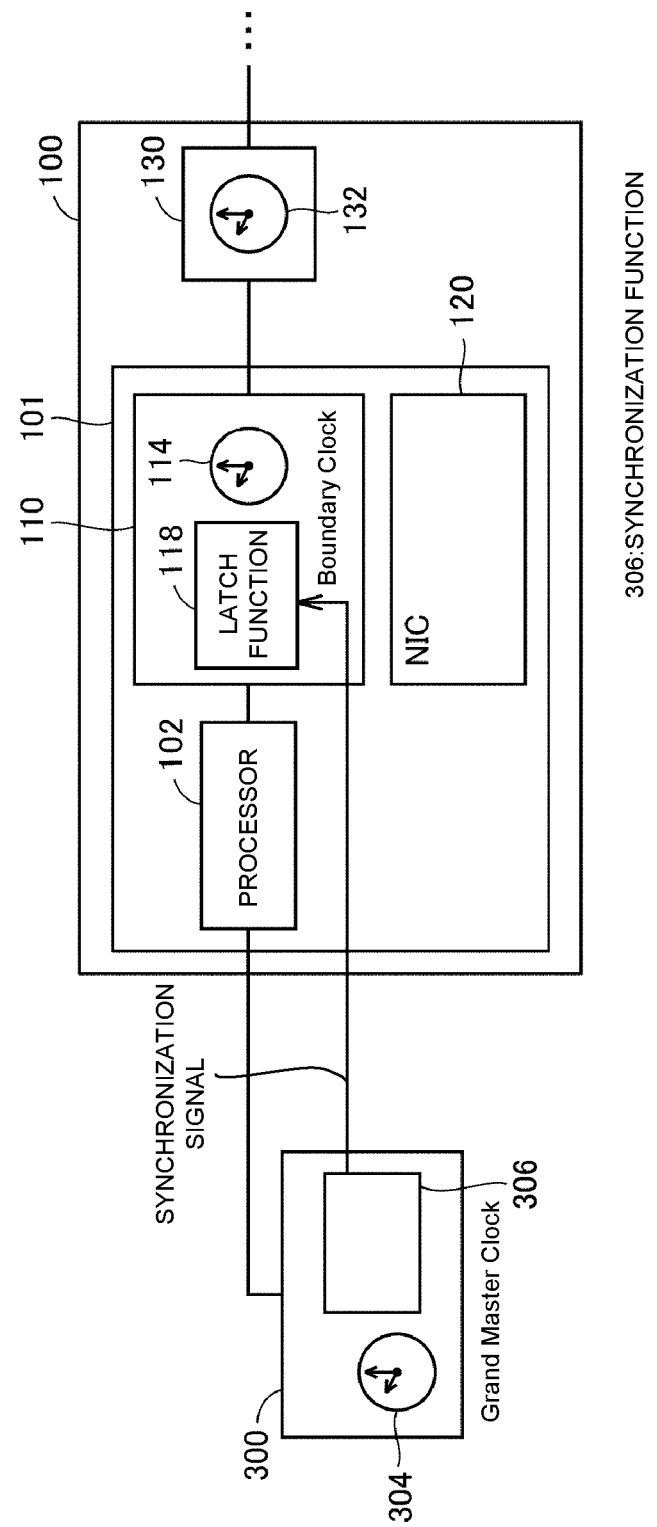
FIG. 7 is a schematic diagram illustrating principal parts of a CPU unit and an external device illustrated in FIG. 6.

FIG. 7 is a schematic diagram illustrating principal parts of the CPU unit 100 and the external device 300 illustrated in FIG. 6. Referring to FIG. 7, in order to realize time synchronization with the timer 304 of the external device 300 as a reference clock (reference numeral 404 in FIG. 6), a latch function 118 is provided in the timer 114 of the communication control circuit 110 and a synchronization function 306 is provided in the timer 304 of the external device 300. The latch function 118 of the timer 114 latches the local time at which a synchronization signal (SYNC) input from the external device 300 is asserted. Time correction for the timer 114 is performed on the basis of a difference between the time at which the external device 300 asserts the synchronization signal and the time at which the timer 114 of the communication control circuit 110 detects the synchronization signal.

Figure 8:
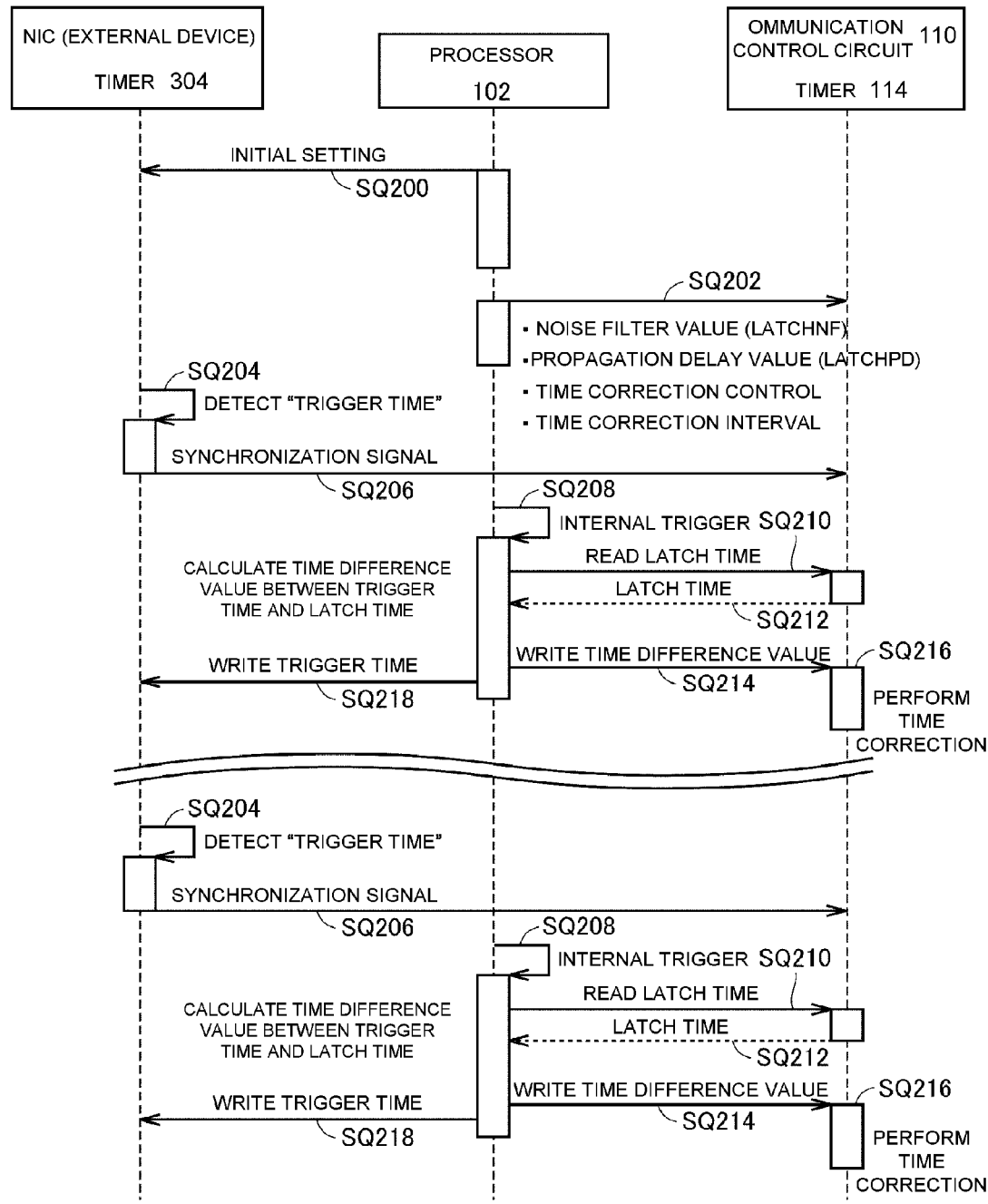
FIG. 8 is a sequence diagram illustrating an example of a time synchronization procedure between a timer of a communication control circuit and a timer of a bus master circuit in configuration example 2 of the control system according to the embodiment.

FIG. 8 is a sequence diagram illustrating an example of a time synchronization procedure between the timer 304 of the external device 300 and the timer 114 of the communication control circuit 110 in configuration example 2 of the control system 1 according to this embodiment. In the sequence diagram illustrated in FIG. 8, the timer 304 of the external device 300, the processor 102, and the timer 114 of the communication control circuit 110 cooperate with each other to realize time synchronization between the timer 304 of the external device 300 and the timer 114 of the communication control circuit 110. It is assumed that each of the timer 304 and the timer 114 includes a free-run counter and a logic that calculates a local time from a counter value output from the free-run counter.

In this embodiment, the timer 304 of the external device 300 asserts a synchronization signal (SYNC) at a trigger time (TRGTTML) which is designated by the processor 102. The latch function 118 of the timer 114 latches a local time (hereinafter also referred to as a "latch time") at which the synchronization signal (SYNC) input from the external device 300 is detected. Time correction for the timer 114 is performed on the basis of a difference (a time difference value) between the trigger time at which the synchronization signal is asserted by the external device 300 and the latch time at which the local time is latched by the latch function 118 of the timer 114 of the communication control circuit 110.

More specifically, as illustrated in FIG. 8, first, the processor 102 performs necessary initial setting for the timer 304 of the external device 300 (Sequence SQ200). The initial setting includes setting of a time (a trigger time) at which a synchronization signal is first generated. That is, as a part of the time synchronization function, the processor 102 sets the timer 304 of the external device 300 such that the synchronization signal is output to the timer 114 of the communication control circuit 110 at the designated trigger time.

As an additional process, the processor 102 performs initial setting of a parameter for correcting a detection error due to a noise filter for the timer 114 of the communication control circuit 110 (Sequence SQ202). This correction of the detection error will be described in detail later. The correction of the detection error is necessary when a noise filter is provided in the latch function 118 of the timer 114, and the process of Sequence SQ202 may be skipped when a noise filter is not provided.

When the timer 304 of the external device 300 counts up to the designated trigger time, the timer 304 asserts a synchronization signal to the timer 114 (Sequence SQ206). When the synchronization signal asserted by the timer 304 of the external device 300 is detected, the timer 114 latches the local time indicating the detection time in a register.

After the synchronization signal is asserted, the processor 102 generates an internal trigger thereof (Sequence SQ208), reads a value of the local time (the latch time) latched in the register of the timer 114 of the communication control circuit 110 (Sequence SQ210), and acquires the latch time (Sequence SQ212). In this way, as a part of the time synchronization function, the processor 102 reads the local time (the latch time) in the timer 114, which is stored when the synchronization signal output from the timer 304 of the external device 300 is detected by the timer 114 of the communication control circuit 110, from the timer 114.

Then, the processor 102 calculates a difference (a time difference value) between the trigger time and the acquired latch time and writes the time difference value to the register of the timer 114 (Sequence SQ214). Then, the timer 114 of the communication control circuit 110 performs time correction on the basis of the time difference value written to the register thereof (Sequence SQ216). In this way, as a part of the time synchronization function, the processor 102 instructs the timer 114 to perform the time correction on the basis of the difference between the time (the trigger time) at which the synchronization signal is generated and the local time (the latch time) in the timer 114 which is stored when the synchronization signal is detected by the timer 114.

On the other hand, the processor 102 sets a time (a trigger time) at which a synchronization signal will be generated next for the timer 304 of the external device 300 (Sequence SQ218). The processes of Sequences SQ204 to SQ218 are repeated until the correction value in Sequence SQ216 is equal to or less than the predetermined value.

Through the above-mentioned procedure, the time synchronization between the timer 304 of the external device 300 and the timer 114 of the communication control circuit 110 is realized. When the time synchronization between the timer 304 of the external device 300 and the timer 114 of the communication control circuit 110 is not achieved, the time synchronization is realized again by repeatedly performing the processes of SQ204 to SQ218.

In configuration example 2 of the control system 1 according to this embodiment, an arbitrary reference clock can be newly provided in one or more existing configurations according to a protocol and then the entire control system 1 can be synchronized with the reference clock.

A method of correcting a detection error due to a noise filter when the noise filter is provided in the latch function 118 of the timer 114 of the communication control circuit 110 will be described below.

Figure 9:
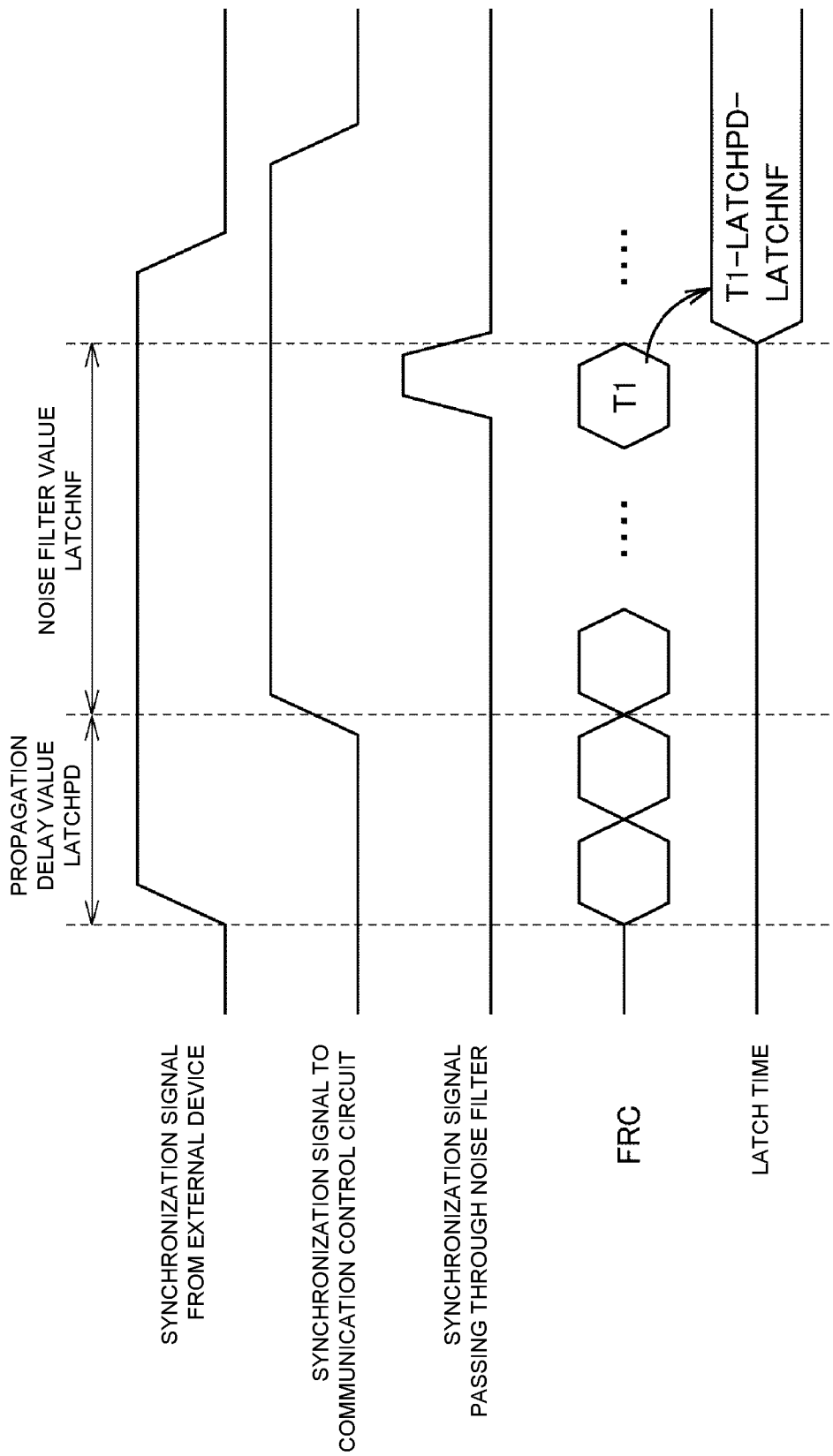
FIG. 9 is a schematic diagram illustrating a method of correcting a detection error in a case in which a noise filter is mounted in a latch function of a timer.

FIG. 9 is a schematic diagram illustrating a method of correcting a detection error in a case in which a noise filter is provided in a latch function of a timer. Referring to FIG. 9, the noise filter of the latch function of the timer is defined by a noise filter value (LATCHNF). When a synchronization signal input to the communication control circuit 110 is activated, a variation (a rise) of a latch signal is detected and a local time at which the synchronization signal is activated is latched. When the counter value of a free-run counter at a time at which the synchronization signal passing through the noise filter varies is defined as T1, a time (that is, a latch time which will be originally stored) at which the synchronization signal is actually asserted by the timer 304 of the external device 300 can be calculated by the following expression.

Original latch time=counter value $T1$ –propagation delay value (LATCHPD)–noise filter value (LATCHNF)

That is, in Sequence SQ206 illustrated in FIG. 8, when the timer 304 of the external device 300 asserts the synchronization signal to the timer 114 of the communication control circuit 110, the timer 114 acquires the counter value T1 of the free-run counter therein at a time at which the synchronization signal passing through the noise filter varies, and stores a value obtained by subtracting a propagation delay value (LATCHPD) and a noise filter value (LATCHNF) from the acquired counter value T1 as a latch time in a register.

In this way, the processor 102 having the time synchronization function provides setting for the noise filter included in the timer 114. The timer 114 compensates for a time delay which is generated due to the noise filter on the basis of setting for the noise filter and then stores (latches) the latch time.

As described above, when a noise filter function is provided in the latch function 118 of the timer 114, it is possible to reduce an influence of noise included in the synchronization signal but there is a likelihood that accuracy of time synchronization will deteriorate due to a response delay from the noise filter. On the other hand, in the control system 1 according to this embodiment, it is possible to maintain accuracy of time synchronization by performing correction based on characteristics of the noise filter.

E. Configuration Example 3 of Control System

In configuration example 2 of the control system 1, an example in which the timer 304 of the external device 300 functions as a grand master clock has been described above, but the timer 114 of the communication control circuit 110 may function as a grand master clock for the timer 304 of the external device 300.

Figure 10:
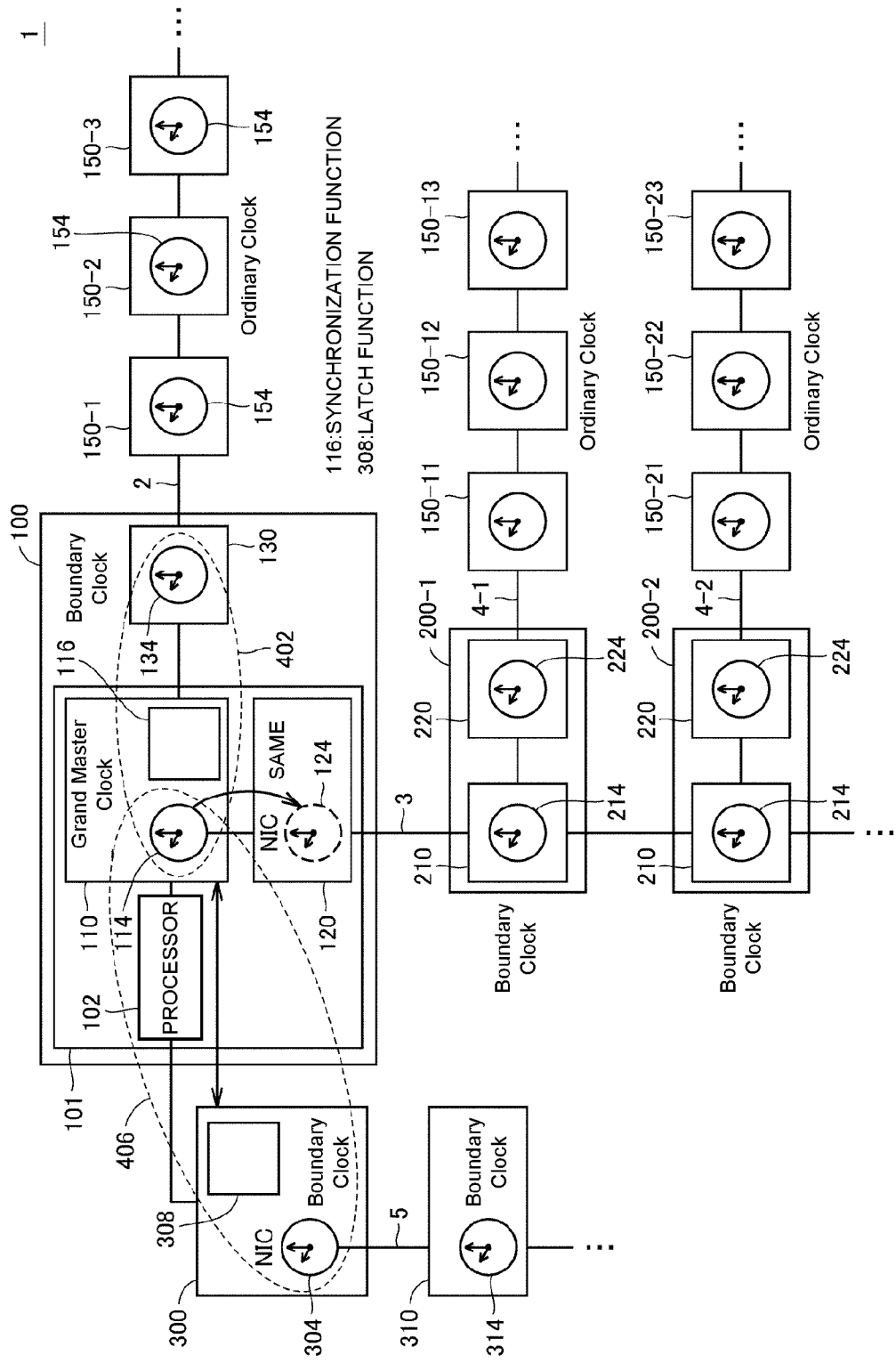
FIG. 10 is a schematic diagram illustrating functions of timers in configuration example 3 of the control system according to the embodiment.

FIG. 10 is a schematic diagram illustrating functions of timers in configuration example 3 of the control system 1 according to this embodiment. Configuration example 3 illustrated in FIG. 10 is the same as configuration example 2 illustrated in FIG. 6, except that the timer 114 of the communication control circuit 110 functions as a grand master clock and the timer 304 of the external device 300 functions as a boundary clock. That is, in configuration example 3 illustrated in FIG. 10, the timer 304 of the external device 300 outside the CPU unit 100 in addition to the timer 134 of the bus master circuit 130 in the CPU unit 100 is time-synchronized with the timer 114 of the communication control circuit 110 as a reference clock. The timer 314 of the slave device 310 connected to the field network 5 is time-synchronized with the timer 304 of the external device 300 as a reference clock. As a result, functional units connected to the CPU unit 100 via other communication means as well as the functional units 150 connected to the CPU unit 100 via a local bus or a field network can be time-synchronized.

Figure 11:
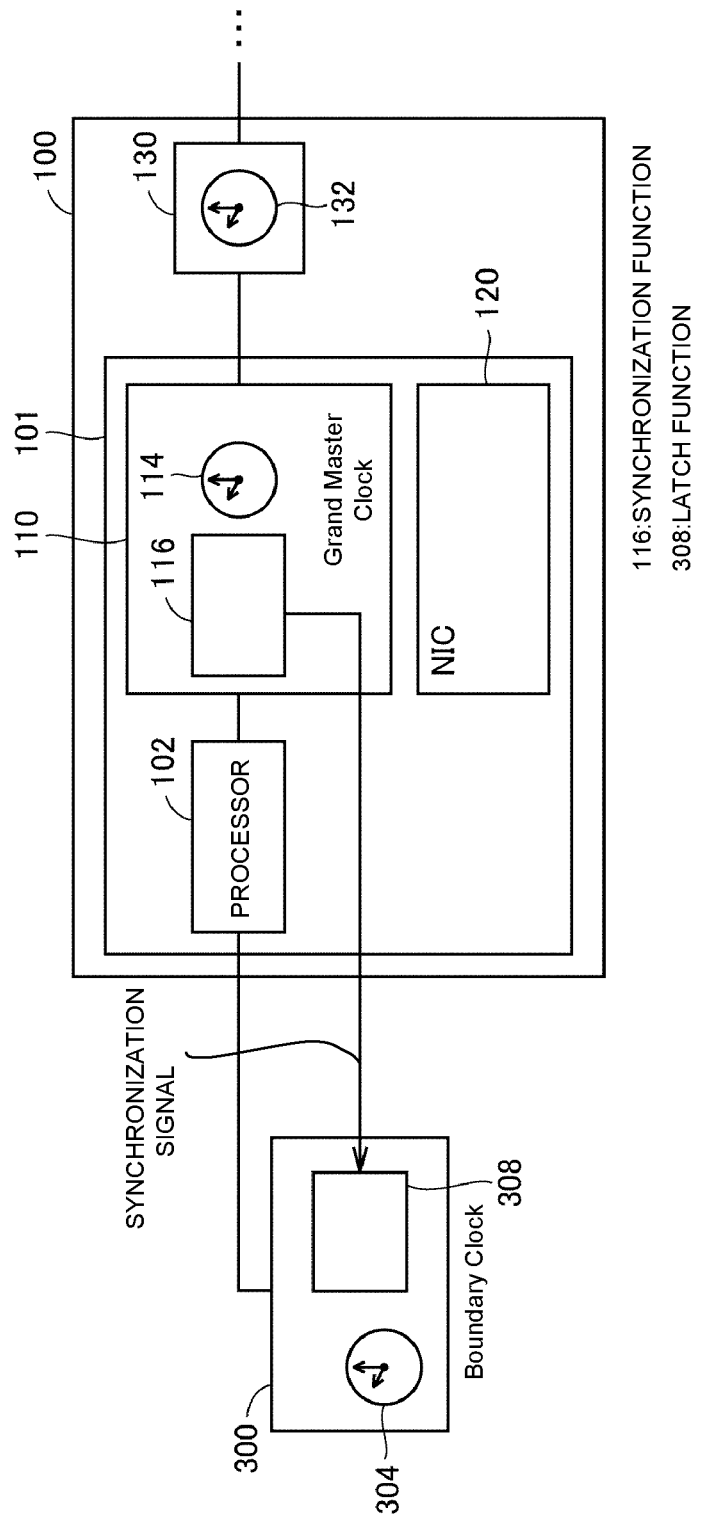
FIG. 11 is a schematic diagram illustrating principal parts of a CPU unit and an external device illustrated in FIG. 10.

FIG. 11 is a schematic diagram illustrating principal parts of the CPU unit 100 and the external device 300 illustrated in FIG. 10. Referring to FIG. 11, in order to realize time synchronization (reference numeral 406 in FIG. 10) with the timer 114 of the communication control circuit 110 as a reference clock, the synchronization function 116 is provided in the timer 114 of the communication control circuit 110 and the latch function 308 is provided in the timer 304 of the external device 300. The synchronization function 116 of the timer 114 asserts a synchronization signal (SYNC) every predetermined cycle. Time correction on the timer 304 is performed on the basis of a difference between the time at which the timer 114 of the communication control circuit 110 asserts the synchronization signal and the time at which the timer 304 of the external device 300 detects the synchronization signal.

Figure 12:
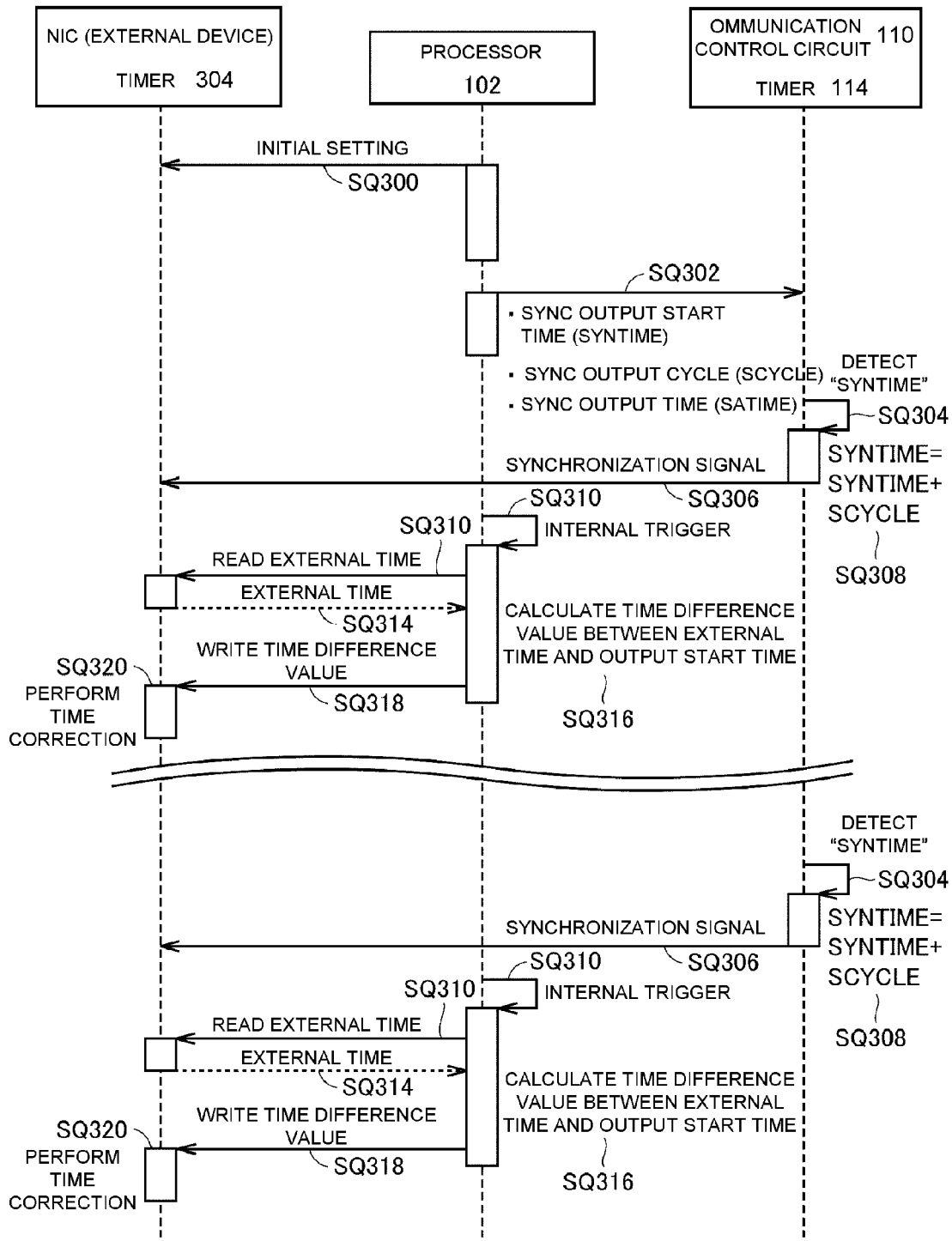
FIG. 12 is a sequence diagram illustrating an example of a time synchronization procedure between a timer of a communication control circuit and a timer of a bus master circuit in configuration example 3 of the control system according to the embodiment.

FIG. 12 is a sequence diagram illustrating an example of a time synchronization procedure between the timer 114 of the communication control circuit 110 and the timer 304 of the external device 300 in configuration example 3 of the control system 1 according to this embodiment. In the sequence diagram illustrated in FIG. 12, the timer 304 of the external device 300, the processor 102, and the timer 114 of the communication control circuit 110 cooperate with each other to realize time synchronization between the timer 114 of the communication control circuit 110 and the timer 304 of the external device 300. It is assumed that each of the timer 114 and the timer 304 includes a free-run counter and a logic that calculates a local time from a counter value output from the free-run counter.

In this embodiment, the timer 114 of the communication control circuit 110 asserts a synchronization signal (SYNC) every predetermined cycle (that is, an output period of a synchronization signal (SCYCLE)) designated by the processor 102. The latch function 308 of the external device 300 latches a local time (hereinafter also referred to as an "external time") at which the synchronization signal (SYNC) input from the communication control circuit 110 is detected. Time correction on the timer 304 is performed on the basis of a difference (a time difference value) between the external time which is latched by the latch function 308 of the timer 304 of the external device 300 and the output start time at which the synchronization signal is asserted by the communication control circuit 110.

More specifically, as illustrated in FIG. 12, first, the processor 102 performs necessary initial setting on the timer 304 of the external device 300 (Sequence SQ300). The processor 102 sets the output start time (SYNTIME) of the synchronization signal, the output cycle (SCYCLE) of the synchronization signal, and the output time (SATIME) of the synchronization signal as parameters required for the time synchronization for the timer 114 of the communication control circuit 110 (Sequence SQ302).

FIG. 13 is a timing chart illustrating a relationship between parameters set in sequence SQ302 in FIG. 12 and an asserted synchronization signal. Referring to FIG. 13, a first synchronization signal is asserted at the output start time (SYNTIME). Asserting of the synchronization signal is continuously performed for the output time (SATIME) from the output start time. Then, when a next cycle arrives, that is, when a next output cycle (SYNTIME←SYNTIME+ SCYCLE) arrives, a next synchronization signal is asserted. In a period of the output cycle (SCYCLE) from which the output time (SATIME) is excluded, the synchronization function is deactivated.

Referring to FIG. 12, when the timer 114 of the communication control circuit 110 counts up to the designated output start time (SYNTIME) (Sequence SQ304), the timer 114 asserts the synchronization signal to the timer 304 (Sequence SQ306). When the synchronization signal asserted by the timer 114 of the communication control circuit 110 is detected, the timer 304 latches a local time (an external time) indicating the detected time in a register.

The timer 114 of the communication control circuit 110 calculates the output start time of the next cycle (Sequence SQ308).

After the synchronization signal is asserted, the processor 102 generates an internal trigger thereof (Sequence SQ310), reads a value of the local time (the external time) latched in the register of the timer 304 of the external device 300 (Sequence SQ312), and acquires the external time (Sequence SQ314). Then, the processor 102 calculates a difference (a time difference value) between the acquired external time and the output start time (Sequence SQ316) and writes the time difference value to the register of the timer 304 (Sequence SQ318). Then, the timer 304 of the external device 300 performs time correction on the basis of the time difference value written to the register thereof (Sequence SQ320).

The processes of Sequences SQ304 to SQ320 are repeated until the correction value in Sequence SQ320 is equal to or less than a predetermined value.

Through the above-mentioned procedure, the time synchronization between the timer 114 of the communication control circuit 110 and the timer 304 of the external device 300 is realized. When the timer 114 of the communication control circuit 110 and the timer 304 of the external device 300 are time-desynchronized with each other, the time synchronization is realized again by repeatedly performing the processes of Sequences SQ304 to SQ320.

In configuration example 3 of the control system 1 according to this embodiment, even when an arbitrary element including a clock is newly provided in an existing configuration according to an arbitrary protocol, the clock included in the newly provided element can be synchronized with a clock of the existing configuration and it is thus possible to synchronize the entire control system 1.

F. Configuration Example 4 of Control System

In configuration example 2 of the control system 1, a configuration in which the CPU unit 100 and the external device 300 are directly connected to each other has been described above, but the external device 300 including the timer 304 may be connected to the CPU unit 100 via a local bus 2 or the field network. In this way, a clock included in the external device 300 which is indirectly connected to the CPU unit 100 may function as a grand master clock.

Figure 14:
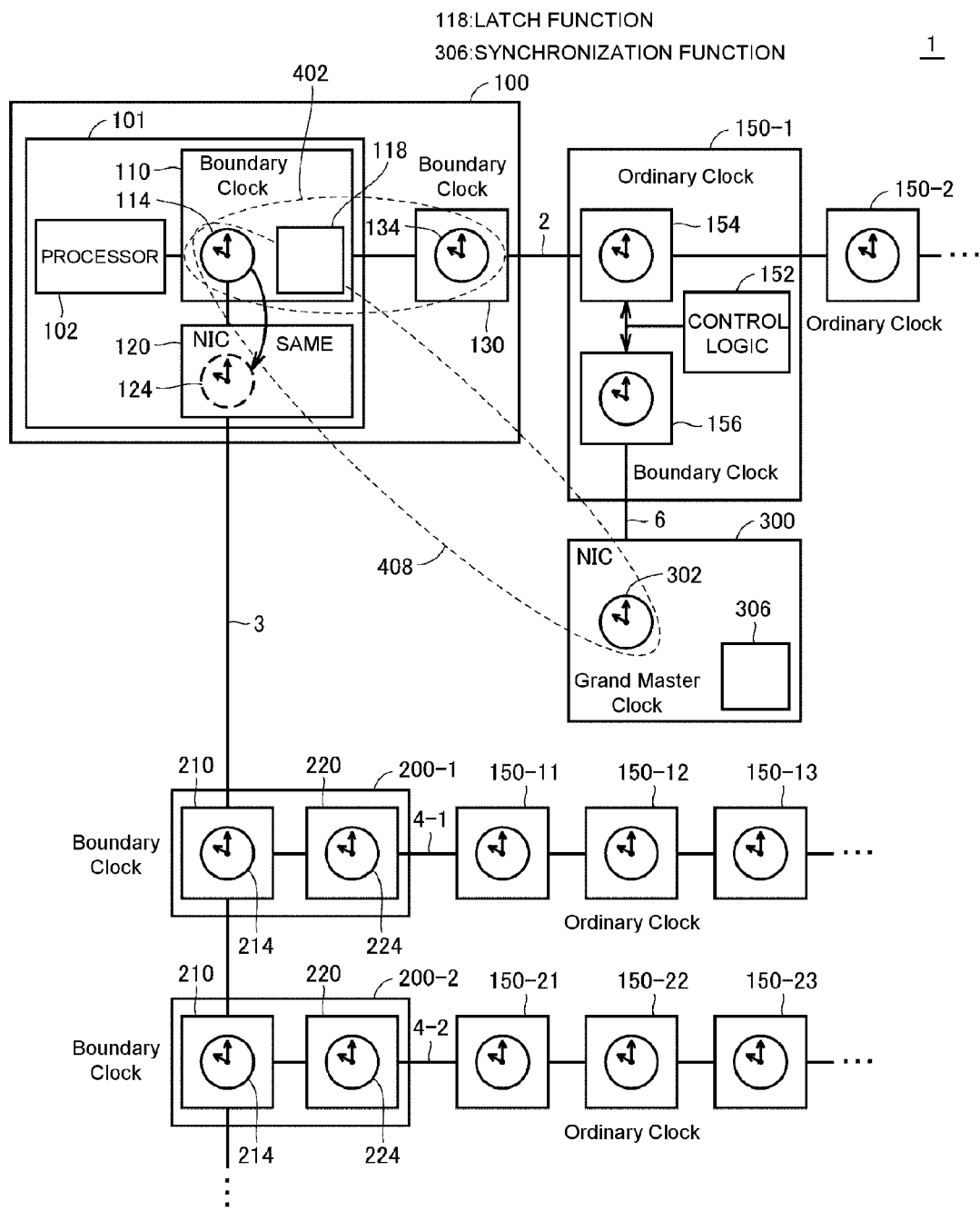
FIG. 14 is a schematic diagram illustrating functions of timers in configuration example 4 of the control system according to the embodiment.

FIG. 14 is a schematic diagram illustrating functions of timers in configuration example 4 of the control system 1 according to this embodiment. In configuration example 4 illustrated in FIG. 14, the external device 300 is connected subordinate to the functional unit 150-1. The functional unit 150-1 includes another timer 156 functioning as a boundary clock of a field network 6 for connection of the external device 300 in addition to the control logic 152 and the timer 154.

The timer 304 of the external device 300 is a reference clock of the timer 114 of the communication control circuit 110. That is, the timer 114 of the communication control circuit 110 is synchronized with the timer 304 of the external device 300 functioning as a grand master clock. In order to realize time synchronization (reference numeral 408 in FIG. 6) with the timer 304 of the external device 300 as a reference clock, a latch function 118 is provided in the timer 114 of the communication control circuit 110 and a synchronization function 306 is provided in the timer 304 of the external device 300.

In configuration example 4 illustrated in FIG. 14, the external device 300 is connected to the CPU unit 100 via entities (the functional units 150-1, 150-2, . . . ) which transmit and receive data to and from the bus master circuit 130. Since the timer 114 of the communication control circuit 110 of the CPU unit 100 is connected to the timer 304 of the external device 300 via the local bus 2, the functional unit 150-1, and the field network 6, time synchronization between the timer 114 of the communication control circuit 110 and the timer 134 of the bus master circuit 130 is realized by performing the time synchronization procedures illustrated in FIGS. 8 and 12 in combination. The time synchronization procedures are the same as described above in detail and thus description thereof will not be repeated here.

In configuration example 4 of the control system 1 according to this embodiment, even an external device which is connected via a new bus or network branched from a functional unit constituting an existing control system can function as a grand master clock. Accordingly, it is possible to reduce constraints when a clock for synchronizing the entire control system 1 is provided.

G. Configuration Example 5 of Control System

In configuration example 4 of the control system 1, a configuration in which the CPU unit 100 and the external device 300 are indirectly connected to each other has been described above, but another configuration having such indirect connection can be supposed.

Figure 15:
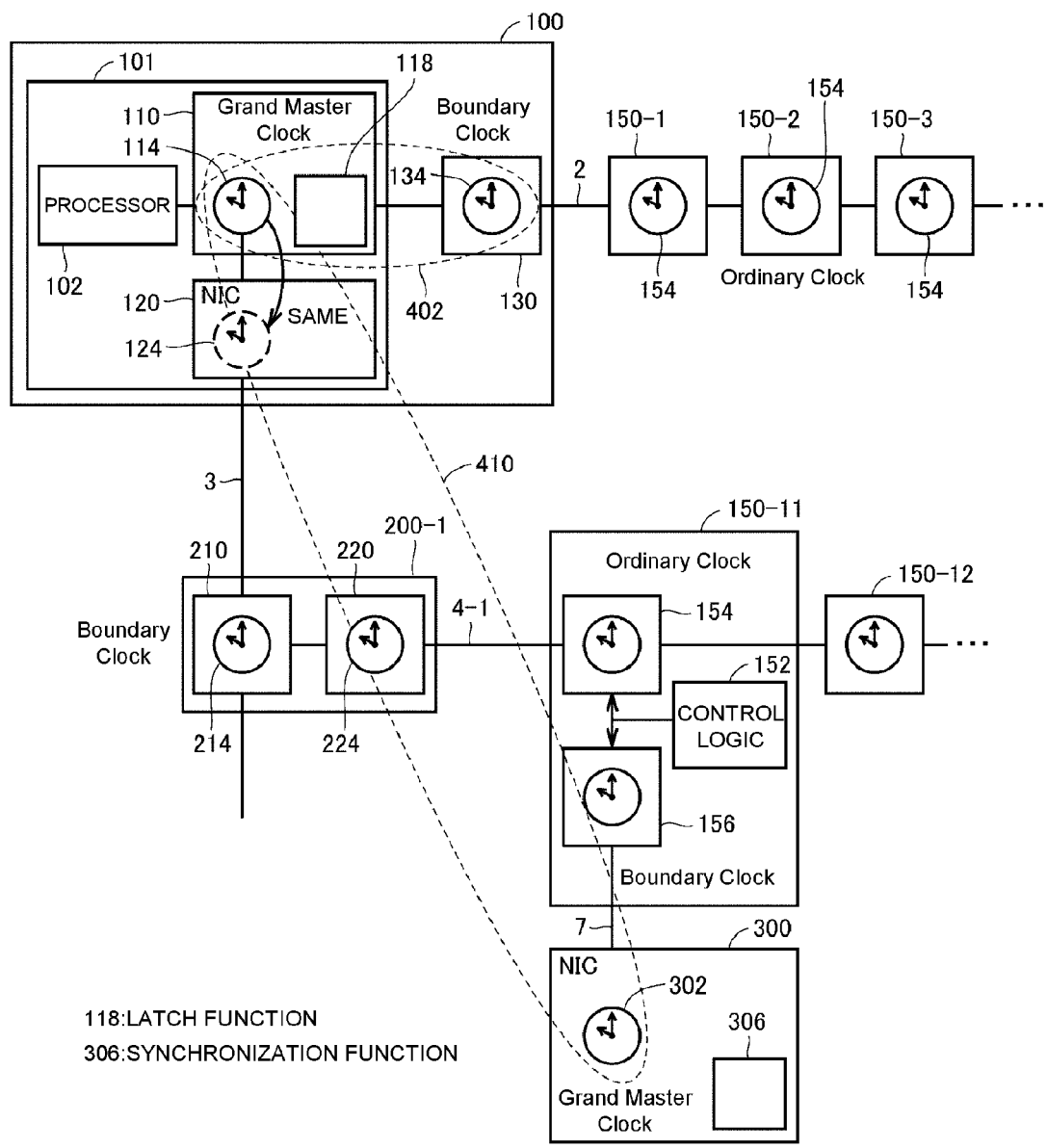
FIG. 15 is a schematic diagram illustrating functions of timers in configuration example 5 of the control system according to the embodiment.

FIG. 15 is a schematic diagram illustrating functions of timers in configuration example 5 of the control system 1 according to this embodiment. In configuration example 5 illustrated in FIG. 15, the external device 300 is connected subordinate to the functional unit 150-11. The functional unit 150-11 includes another timer 156 functioning as a boundary clock of a field network 7 for connection of the external device 300 in addition to the control logic 152 and the timer 154.

The timer 304 of the external device 300 is a reference clock of the timer 114 of the communication control circuit 110. That is, the timer 114 of the communication control circuit 110 is synchronized with the timer 304 of the external device 300 functioning as a grand master clock. In order to realize time synchronization (reference numeral 410 in FIG. 6) with the timer 304 of the external device 300 as a reference clock, a latch function 118 is provided in the timer 114 of the communication control circuit 110 and a synchronization function 306 is provided in the timer 304 of the external device 300.

In configuration example 5 illustrated in FIG. 15, the external device 300 is connected to the CPU unit 100 via entities (the functional units 150-11, 150-12, . . . ) which transmit and receive data to and from the NIC 120. Since the timer 114 of the communication control circuit 110 of the CPU unit 100 is connected to the timer 304 of the external device 300 via the field network 3, the communication coupler unit 200-1, the local bus 4-1, the functional unit 150-11, and the field network 7, time synchronization between the timer 114 of the communication control circuit 110 and the timer 134 of the bus master circuit 130 is realized by performing the time synchronization procedures illustrated in FIGS. 8 and 12 in combination. The time synchronization procedures are the same as described above in detail and thus description thereof will not be repeated here.

In configuration example 5 of the control system 1 according to this embodiment, even an external device which is connected via a new bus or network branched from a functional unit constituting an existing control system can function as a grand master clock. Accordingly, it is possible to reduce constraints when a clock for synchronizing the entire control system 1 is provided.

H. Configuration Example 6 of Control System

In configuration examples 5 and 6 of the control system 1, a configuration in which the timer 304 of the external device 300 functions as a grand master clock has been described above, but the timer 114 of the communication control circuit 110 may function as a grand master clock for the timer 304 of the external device 300 as described in configuration example 3 (see FIG. 10 and the like) of the control system 1. That is, the timer 304 of the external device 300 may use the timer 114 of the communication control circuit 110 as a reference clock. This configuration is the same as in configuration example 3 and thus detailed description thereof will not be repeated.

I. Modified Example

In the above-mentioned embodiment, the present invention is applied to the control system 1 for controlling machines or facilities, but the present invention can be applied to a general network configuration. An example of such a network configuration is a configuration in which guaranteeing of a transmission time of data or an arrival time is required such as a higher network connected to a plurality of PLCs. Applications of the present invention are not limited to such configurations.

J. Advantages

In the control system 1 according to this embodiment, since communication means according to different protocols can be time-synchronized with each other, it is possible to realize time synchronization of an entire control system without depending on protocols of buses or networks used to connect the CPU unit and the functional units. Accordingly, it is possible to synchronize input times and/or output times of a plurality of slave units (typically, functional units) connected to the communication means according to different protocols and to enhance control accuracy.

According to the related art, in order to realize synchronization control of synchronizing input times and/or output times of a plurality of slave units (typically, functional units), it is necessary to connect all the slave units that are targets via communication means according to the same protocol, which causes a burden such as an increase in the number of introduction process steps or an increase in introduction costs. However, according to this embodiment, it is possible to reduce such a burden.

In the control system 1 according to this embodiment, a clock functioning as a grand master clock can be provided in an arbitrary device or unit. Accordingly, for example, even when a new CPU unit, a new functional unit, or the like is added to an existing control system, it is possible to easily realize time synchronization between the existing system and the new system. Accordingly, even when modifications such as certain additions or alternations are applied to an existing control system, it is possible to maintain time synchronization of the system as a whole. Accordingly, even when an existing control system is extended or a plurality of control systems are newly constructed, it is possible to develop a control system with a higher degree of freedom without considering a particular idea for achieving time synchronization.

The above-disclosed embodiment should be understood to be merely exemplary and not restrictive in all respects. The scope of the present invention is defined by the appended claims, not by the above description, and is intended to include all modifications within meanings and scopes equivalent to the claims.

What is claimed is:

1. A control device that constitutes a control system for controlling machines or facilities, the control device comprising:
    a first communication circuit configured to transmit and receive data in accordance with a first protocol, the first communication circuit including a first timer that defines a time of data transmission and is time-synchronized with an entity to and from which data is transmitted and received;
    a second communication circuit configured to transmit and receive data in accordance with a second protocol different from the first protocol, the second communication circuit including a second timer that defines a time of data transmission and is time-synchronized with an entity to and from which data is transmitted and received; and
    a processor configured to time-synchronize the first timer and the second timer, wherein the processor time-corrects the second timer with respect to the first timer, and the processor time-synchronizes each entity time-synchronized with the second communication circuit with the second timer which has been time-corrected.

2. The control device according to claim 1, wherein the processor is
    configured to set the first timer to output a synchronization signal to the second timer every predetermined cycle;
    notify the second timer of a first time in the first timer indicating a time at which the synchronization signal is output and which is set in the first timer; and
    time-correct the second timer on the basis of a difference between the first time and a second time in the second timer at which the synchronization signal output from the first timer is detected by the second timer.

3. The control device according to claim 1, further comprising an interface for connection to an external device including a third timer,
wherein the processor time-corrects the first timer and the second timer with respect to the third timer of the external device.

4. The control device according to claim 3, wherein the external device is connected to the control device via a third communication circuit which is independent from the first communication circuit and the second communication circuit.

5. The control device according to claim 3, wherein the external device is connected to the control device via an entity that transmits and receives data to and from any one of the first communication circuit and the second communication circuit.

6. The control device according to claim 3, wherein the processor is
configured to set the third timer to output a synchronization signal to the first timer at a designated third time;
read a fourth time in the first timer which is stored when the synchronization signal output from the third timer is detected by the first timer from the first timer; and
instruct the first timer to correct time on the basis of a difference between the third time and the fourth time.

7. The control device according to claim 6, wherein the processor is configured to provide setting for a noise filter included in the first timer, and
the first timer compensates for a time delay generated due to the noise filter on the basis of the setting for the noise filter and then stores the fourth time.

8. A communication device comprising:
a first communication circuit configured to transmit and receive data in accordance with a first protocol, the first communication circuit including a first timer that defines a time of data transmission and is time-synchronized with an entity to and from which data is transmitted and received;
a second communication circuit configured to transmit and receive data in accordance with a second protocol different from the first protocol, the second communication circuit including a second timer that defines a time of data transmission and is time-synchronized with an entity to and from which data is transmitted and received; and
a processor configured to time-synchronize the first timer and the second timer, wherein the processor time-corrects the second timer with respect to the first timer, and the processor time-synchronizes each entity time-synchronized with the second communication circuit with the second timer which has been time-corrected.

* * * * *